(12) United States Patent
Matsushima et al.

(10) Patent No.: US 12,116,820 B2
(45) Date of Patent: Oct. 15, 2024

(54) MONITORING APPARATUS AND MONITORING METHOD

(71) Applicant: FUJI ELECTRIC CO., LTD., Kanagawa (JP)

(72) Inventors: Hidenori Matsushima, Kanagawa (JP); Kenji Fujita, Chiba (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 158 days.

(21) Appl. No.: 17/652,144

(22) Filed: Feb. 23, 2022

(65) Prior Publication Data

US 2022/0307310 A1    Sep. 29, 2022

(30) Foreign Application Priority Data

Mar. 25, 2021   (JP) ................................ 2021-052212

(51) Int. Cl.
| | | |
|---|---|---|
| E05F 15/40 | (2015.01) | |
| E05F 15/659 | (2015.01) | |
| G05B 23/02 | (2006.01) | |
| G07C 3/14 | (2006.01) | |

(52) U.S. Cl.
CPC ............ *E05F 15/40* (2015.01); *E05F 15/659* (2015.01); *G05B 23/02* (2013.01); *G07C 3/14* (2013.01); *E05Y 2400/44* (2013.01); *E05Y 2400/508* (2013.01); *E05Y 2400/654* (2013.01); *E05Y 2900/51* (2013.01); *E05Y 2900/531* (2013.01)

(58) Field of Classification Search
CPC ........ E05F 15/40; E05F 15/659; G05B 23/02; G07C 3/14; E05Y 2400/44; E05Y 2400/508; E05Y 2400/654; E05Y 2900/51; E05Y 2900/531
USPC .......................................................... 702/116
See application file for complete search history.

(56) References Cited

U.S. PATENT DOCUMENTS

| | | | |
|---|---|---|---|
| 8,952,811 B2* | 2/2015 | No ......................... | E05F 15/41 |
| | | | 340/540 |
| 2004/0251868 A1 | 12/2004 | Sato et al. | |
| 2020/0149339 A1 | 5/2020 | Uno et al. | |
| 2020/0240195 A1* | 7/2020 | Anzai ................... | H04L 67/125 |
| 2021/0039683 A1* | 2/2021 | Ye ............................ | B61B 1/02 |

FOREIGN PATENT DOCUMENTS

| | | |
|---|---|---|
| EP | 2404805 | 1/2012 |
| JP | 2005-002621 | 1/2005 |
| JP | 2020-075633 | 5/2020 |
| WO | 2010/100988 | 9/2010 |

OTHER PUBLICATIONS

Office Action mailed on Jun. 1, 2021 issued with respect to the basic Japanese Patent Application No. 2021-052212.

* cited by examiner

*Primary Examiner* — Aditya S Bhat
(74) *Attorney, Agent, or Firm* — IPUSA, PLLC

(57) ABSTRACT

A monitoring apparatus includes a sensing circuitry configured to sense a locked or released state of a door of a railway vehicle, or sense an open or closed state of the door, and a processor. The processor acquires an output of the sensing circuitry, and position information in an opening or closing direction of the door, and determines an abnormality in a configuration related to an opening or closing operation of the door, based on a match between the acquired output of the sensing circuitry and the position information.

17 Claims, 25 Drawing Sheets

FIG.9

When Opening Door

| Door | Fully Closed & Locked | Fully Closed & Released | Start Opening Operation | During Opening Operation | Fully Open |
|---|---|---|---|---|---|
| DLS (Normal) | A-Contact=On<br>B-Contact=Off | A-Contact=Off<br>B-Contact=On | A-Contact=Off<br>B-Contact=On | A-Contact=Off<br>B-Contact=On | A-Contact=Off<br>B-Contact=On |
| DCS (Normal) | A-Contact=On<br>B-Contact=Off | A-Contact=On<br>B-Contact=Off | A-Contact=Off<br>B-Contact=On | A-Contact=Off<br>B-Contact=On | A-Contact=Off<br>B-Contact=On |
| Encoder Position Information | Fully Closed Position | Fully Closed Position | Opening Operation Position (Intermediate Position) | Opening Operation Position (Intermediate Position) | Fully Open Position |
| Conditions Determining Abnormality | Untargeted For Determination | Untargeted For Determination | DLS:<br>A-Contact=On<br>B-Contact=Off<br>DCS:<br>A-Contact=On<br>B-Contact=Off | DLS:<br>A-Contact=On<br>B-Contact=Off<br>DCS:<br>A-Contact=On<br>B-Contact=Off | DLS:<br>A-Contact=On<br>B-Contact=Off<br>DCS:<br>A-Contact=On<br>B-Contact=Off |

FIG.10

When Closing Door

| Door | Fully Open | Start Closing Operation | During Closing Operation | Fully Closed & Released | Fully Closed & Locked |
|---|---|---|---|---|---|
| DLS (Normal) | A-Contact=Off B-Contact=On | A-Contact=Off B-Contact=On | A-Contact=Off B-Contact=On | A-Contact=Off B-Contact=On | A-Contact=On B-Contact=Off |
| DCS (Normal) | A-Contact=Off B-Contact=On | A-Contact=Off B-Contact=On | A-Contact=Off B-Contact=On | A-Contact=On B-Contact=Off | A-Contact=On B-Contact=Off |
| Encoder Position Information | Fully Open Position | Closing Operation Position (Intermediate Position) | Closing Operation Position (Intermediate Position) | Fully Closed Position | Fully Closed Position |
| Conditions Determining Abnormality | DLS: A-Contact=On B-Contact=Off DCS: A-Contact=On B-Contact=Off | DLS: A-Contact=On B-Contact=Off DCS: A-Contact=On B-Contact=Off | DLS: A-Contact=On B-Contact=Off DCS: A-Contact=On B-Contact=Off | Untargeted For Determination | Untargeted For Determination |

FIG.20

When Opening Door

| Door | Fully Closed & Locked | Fully Closed & Released | Start Opening Operation | During Opening Operation | Fully Open |
|---|---|---|---|---|---|
| DLS | A-Contact=On<br>B-Contact=Off | A-Contact=Off<br>B-Contact=On | A-Contact=Off<br>B-Contact=On | A-Contact=Off<br>B-Contact=On | A-Contact=Off<br>B-Contact=On |
| DCS | A-Contact=On<br>B-Contact=Off | A-Contact=On<br>B-Contact=Off | A-Contact=Off<br>B-Contact=On | A-Contact=Off<br>B-Contact=On | A-Contact=Off<br>B-Contact=On |
| Encoder Position Information | Fully Closed Position | Fully Closed Position | Opening Operation Position (Intermediate Position) | Opening Operation Position (Intermediate Position) | Fully Open Position |
| Conditions Determining Abnormality | Some DLS:<br>A-Contact=Off<br>B-Contact=On<br>⇒Abnormality of DLS<br>All DLS:<br>A-Contact=Off<br>B-Contact=On<br>⇒Abnormality of Locking Device | Untargeted For Determination | Some DLS:<br>A-Contact=On<br>B-Contact=Off<br>⇒Abnormality of DLS<br>All DLS:<br>A-Contact=On<br>B-Contact=Off<br>⇒Abnormality of Locking Device | Some DLS:<br>A-Contact=On<br>B-Contact=Off<br>⇒Abnormality of DLS<br>All DLS:<br>A-Contact=On<br>B-Contact=Off<br>⇒Abnormality of Locking Device | Some DLS:<br>A-Contact=On<br>B-Contact=Off<br>⇒Abnormality of DLS<br>All DLS:<br>A-Contact=On<br>B-Contact=Off<br>⇒Abnormality of Locking Device |

FIG.21

When Closing Door

| Door | Fully Open | Start Closing Operation | During Closing Operation | Fully Closed & Released | Fully Closed & Locked |
|---|---|---|---|---|---|
| DLS | A-Contact=Off<br>B-Contact=On | A-Contact=Off<br>B-Contact=On | A-Contact=Off<br>B-Contact=On | A-Contact=Off<br>B-Contact=On | A-Contact=On<br>B-Contact=Off |
| DCS | A-Contact=Off<br>B-Contact=On | A-Contact=Off<br>B-Contact=On | A-Contact=Off<br>B-Contact=On | A-Contact=On<br>B-Contact=Off | A-Contact=On<br>B-Contact=Off |
| Encoder Position Information | Fully Open Position | Closing Operation Position (Intermediate Position) | Closing Operation Position (Intermediate Position) | Fully Closed Position | Fully Closed Position |
| Conditions Determining Abnormality | Some DLS:<br>A-Contact=On<br>B-Contact=Off<br>⇒Abnormality of DLS<br>All DLS:<br>A-Contact=On<br>B-Contact=Off<br>⇒Abnormality of Locking Device | Some DLS:<br>A-Contact=On<br>B-Contact=Off<br>⇒Abnormality of DLS<br>All DLS:<br>A-Contact=On<br>B-Contact=Off<br>⇒Abnormality of Locking Device | Some DLS:<br>A-Contact=On<br>B-Contact=Off<br>⇒Abnormality of DLS<br>All DLS:<br>A-Contact=On<br>B-Contact=Off<br>⇒Abnormality of Locking Device | Untargeted For Determination | Some DLS:<br>A-Contact=Off<br>B-Contact=On<br>⇒Abnormality of DLS<br>All DLS:<br>A-Contact=Off<br>B-Contact=On<br>⇒Abnormality of Locking Device |

FIG.22

When Opening Door

| Door | Fully Closed & Locked | Fully Closed & Released | Start Opening Operation | During Opening Operation | Fully Open |
|---|---|---|---|---|---|
| DLS (Normal) | A-Contact=On<br>B-Contact=Off | A-Contact=Off<br>B-Contact=On | A-Contact=Off<br>B-Contact=On | A-Contact=Off<br>B-Contact=On | A-Contact=Off<br>B-Contact=On |
| DCS (Normal) | A-Contact=On<br>B-Contact=Off | A-Contact=On<br>B-Contact=Off | A-Contact=Off<br>B-Contact=On | A-Contact=Off<br>B-Contact=On | A-Contact=Off<br>B-Contact=On |
| Encoder Position Information | Locked Position | Fully Closed Position | Opening Operation Position (Intermediate Position) | Opening Operation Position (Intermediate Position) | Fully Open Position |
| Conditions Determining Abnormality | Untargeted For Determination | DLS:<br>A-Contact=On<br>B-Contact=Off<br>DCS:<br>Untargeted For Determination | DLS:<br>A-Contact=On<br>B-Contact=Off<br>DCS:<br>A-Contact=On<br>B-Contact=Off | DLS:<br>A-Contact=On<br>B-Contact=Off<br>DCS:<br>A-Contact=On<br>B-Contact=Off | DLS:<br>A-Contact=On<br>B-Contact=Off<br>DCS:<br>A-Contact=On<br>B-Contact=Off |

FIG.23

When Closing Door

| Door | Fully Open | Start Closing Operation | During Closing Operation | Fully Closed & Released | Fully Closed & Locked |
|---|---|---|---|---|---|
| DLS (Normal) | A-Contact=Off<br>B-Contact=On | A-Contact=Off<br>B-Contact=On | A-Contact=Off<br>B-Contact=On | A-Contact=Off<br>B-Contact=On | A-Contact=On<br>B-Contact=Off |
| DCS (Normal) | A-Contact=Off<br>B-Contact=On | A-Contact=Off<br>B-Contact=On | A-Contact=Off<br>B-Contact=On | A-Contact=On<br>B-Contact=Off | A-Contact=On<br>B-Contact=Off |
| Encoder Position Information | Locked Position | Closing Operation Position (Intermediate Position) | Closing Operation Position (Intermediate Position) | Fully Closed Position | Locked Position |
| Conditions Determining Abnormality | DLS:<br>A-Contact=On<br>B-Contact=Off<br>DCS:<br>A-Contact=On<br>B-Contact=Off | DLS:<br>A-Contact=On<br>B-Contact=Off<br>DCS:<br>A-Contact=On<br>B-Contact=Off | DLS:<br>A-Contact=On<br>B-Contact=Off<br>DCS:<br>A-Contact=On<br>B-Contact=Off | DLS:<br>A-Contact=On<br>B-Contact=Off<br>DCS:<br>Untargeted For Determination | Untargeted For Determination |

FIG.24

When Opening Door

| Door | Fully Closed & Locked | Fully Closed & Released | Start Opening Operation | During Opening Operation | Fully Open |
|---|---|---|---|---|---|
| DLS | A-Contact=On<br>B-Contact=Off | A-Contact=Off<br>B-Contact=On | A-Contact=Off<br>B-Contact=On | A-Contact=Off<br>B-Contact=On | A-Contact=Off<br>B-Contact=On |
| DCS | A-Contact=On<br>B-Contact=Off | A-Contact=On<br>B-Contact=Off | A-Contact=Off<br>B-Contact=On | A-Contact=Off<br>B-Contact=On | A-Contact=Off<br>B-Contact=On |
| Encoder Position Information | Locked Position | Fully Closed Position | Opening Operation Position (Intermediate Position) | Opening Operation Position (Intermediate Position) | Fully Open Position |
| Conditions Determining Abnormality | Some DLS:<br>A-Contact=Off<br>B-Contact=On<br>⇒Abnormality of DLS<br>All DLS:<br>A-Contact=Off<br>B-Contact=On<br>⇒Abnormality of Locking Device | Some DLS:<br>A-Contact=On<br>B-Contact=Off<br>⇒Abnormality of DLS<br>All DLS:<br>A-Contact=On<br>B-Contact=Off<br>⇒Abnormality of Locking Device | Some DLS:<br>A-Contact=On<br>B-Contact=Off<br>⇒Abnormality of DLS<br>All DLS:<br>A-Contact=On<br>B-Contact=Off<br>⇒Abnormality of Locking Device | Some DLS:<br>A-Contact=On<br>B-Contact=Off<br>⇒Abnormality of DLS<br>All DLS:<br>A-Contact=On<br>B-Contact=Off<br>⇒Abnormality of Locking Device | Some DLS:<br>A-Contact=On<br>B-Contact=Off<br>⇒Abnormality of DLS<br>All DLS:<br>A-Contact=On<br>B-Contact=Off<br>⇒Abnormality of Locking Device |

FIG.25

When Closing Door

| Door | Fully Open | Start Closing Operation | During Closing Operation | Fully Closed & Released | Fully Closed & Locked |
|---|---|---|---|---|---|
| DLS | A-Contact=Off<br>B-Contact=On | A-Contact=Off<br>B-Contact=On | A-Contact=Off<br>B-Contact=On | A-Contact=Off<br>B-Contact=On | A-Contact=On<br>B-Contact=Off |
| DCS | A-Contact=Off<br>B-Contact=On | A-Contact=Off<br>B-Contact=On | A-Contact=Off<br>B-Contact=On | A-Contact=On<br>B-Contact=Off | A-Contact=On<br>B-Contact=Off |
| Encoder Position Information | Fully Open Position | Closing Operation Position (Intermediate Position) | Closing Operation Position (Intermediate Position) | Fully Closed Position | Locked Position |
| Conditions Determining Abnormality | Some DLS:<br>A-Contact=On<br>B-Contact=Off<br>⇒Abnormality of DLS<br>All DLS:<br>A-Contact=On<br>B-Contact=Off<br>⇒Abnormality of Locking Device | Some DLS:<br>A-Contact=On<br>B-Contact=Off<br>⇒Abnormality of DLS<br>All DLS:<br>A-Contact=On<br>B-Contact=Off<br>⇒Abnormality of Locking Device | Some DLS:<br>A-Contact=On<br>B-Contact=Off<br>⇒Abnormality of DLS<br>All DLS:<br>A-Contact=On<br>B-Contact=Off<br>⇒Abnormality of Locking Device | Some DLS:<br>A-Contact=On<br>B-Contact=Off<br>⇒Abnormality of DLS<br>All DLS:<br>A-Contact=On<br>B-Contact=Off<br>⇒Abnormality of Locking Device | Some DLS:<br>A-Contact=Off<br>B-Contact=On<br>⇒Abnormality of DLS<br>All DLS:<br>A-Contact=Off<br>B-Contact=On<br>⇒Abnormality of Locking Device |

MONITORING APPARATUS AND MONITORING METHOD

CROSS-REFERENCE TO RELATED APPLICATIONS

This application is based upon and claims priority to Japanese Patent Application No. 2021-052212, filed on Mar. 25, 2021, the entire contents of which are incorporated herein by reference.

BACKGROUND OF THE INVENTION

1. Field of the Invention

The present disclosure relates to monitoring apparatuses and monitoring methods.

2. Description of the Related Art

For example, there is a known technique for determining an abnormality in a configuration related to door opening or closing operations of a railway vehicle (for example, refer to Japanese Laid-Open Patent Publication No. 2020-075633).

Japanese Laid-Open Patent Publication No. 2020-075633 describes a method for determining an abnormality in a sensing means based on an output of the sensing means, upon completion of a door closing operation, that is, in a fully closed state and a locked state of the door, or upon completion of a door opening operation, that is, in a fully open (or opened) state and a released state of the door.

However, in the method according to Japanese Laid-Open Patent Publication No. 2020-075633, even if the output of the sensing means for sensing a locked or released state of the door or an open or closed state of the door upon completion of the door closing operation, indicates the released state or the open state of the door, for example, it may not be possible to determine whether or not the sensing means is stuck or locked, or whether or not the sensing means has deteriorated. Similarly, in the method according to Japanese Laid-Open Patent Publication No. 2020-075633, even if the output of the detecting means for sensing the locked or released state of the door or the open or closed state of the door upon completion of the door opening operation, indicates the locked state or the closed state of the door, for example, it may not be possible to determine whether or not the sensing means is stuck or locked, or whether or not the sensing means has deteriorated. In addition, in the method according to Japanese Laid-Open Patent Publication No. 2020-075633, it is not possible to know whether or not the sensing means itself is the cause of the inappropriate state indicated by the output of the sensing means, or whether or not a receiving side of the output of the door locking device or the sensing means is the cause of the inappropriate state indicated by the output of the sensing means, and thus, it may not be possible to determine a target which is abnormal.

SUMMARY OF THE INVENTION

Accordingly, in view of the problem described above, one object according to one aspect of the present disclosure is to provide a technique capable of more appropriately determining the abnormality in the configuration related to the door opening or closing operation of the railway vehicle.

According to one aspect of the embodiments of the present disclosure, a monitoring apparatus includes a sensing circuitry configured to sense a locked or released state of a door of a railway vehicle, or sense an open or closed state of the door; and a processor configured to perform a process including acquiring an output of the sensing circuitry, and position information in an opening or closing direction of the door, and determining an abnormality in a configuration related to an opening or closing operation of the door, based on a match between the acquired output of the sensing circuitry and the position information.

According to another aspect of the embodiments of the present disclosure, a monitoring method to be implemented by a computer of a monitoring apparatus, includes acquiring an output of a sensing circuitry of the monitoring apparatus, configured to sense a locked or released state of a door of a railway vehicle, or an open or closed state of the door; acquiring position information in an opening or closing direction of the door; and determining an abnormality in a configuration related to an opening or closing operation of the door, based on a match between the acquired output of the sensing circuitry and the position information.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

BRIEF DESCRIPTION OF THE DRAWINGS

FIG. 9 is a diagram for explaining an example of a method for determining an abnormality in the configuration related to the door opening or closing operation.

FIG. 10 is a diagram illustrating the example of the method for determining the abnormality in the configuration related to the door opening or closing operation.

FIG. 20 is a diagram for explaining another example of the method for determining the abnormality in the configuration related to the door opening or closing operation.

FIG. 21 is a diagram for explaining the other example of the method for determining the abnormality in the configuration related to the door opening or closing operation.

FIG. 22 is a diagram for explaining a further example of the method for determining the abnormality in the configuration related to the door opening or closing operation.

FIG. 23 is a diagram for explaining the further example of the method for determining the abnormality in the configuration related to the door opening or closing operation.

FIG. 24 is a diagram for explaining the further example of the method for determining the abnormality in the configuration related to the door opening or closing operation.

FIG. 25 is a diagram for explaining the further example of the method for determining the abnormality in the configuration related to the door opening or closing operation.

DESCRIPTION OF THE PREFERRED EMBODIMENTS

Hereinafter, embodiments of the present disclosure will be described with reference to the accompanying drawings.

Example of Configuration Related to Door Opening or Closing Operation

First, an example of a configuration related to the opening or closing operation of a door 80 of a railway vehicle 1 will be described, with reference to FIG. 1 through FIG. 6.

Figure 1:
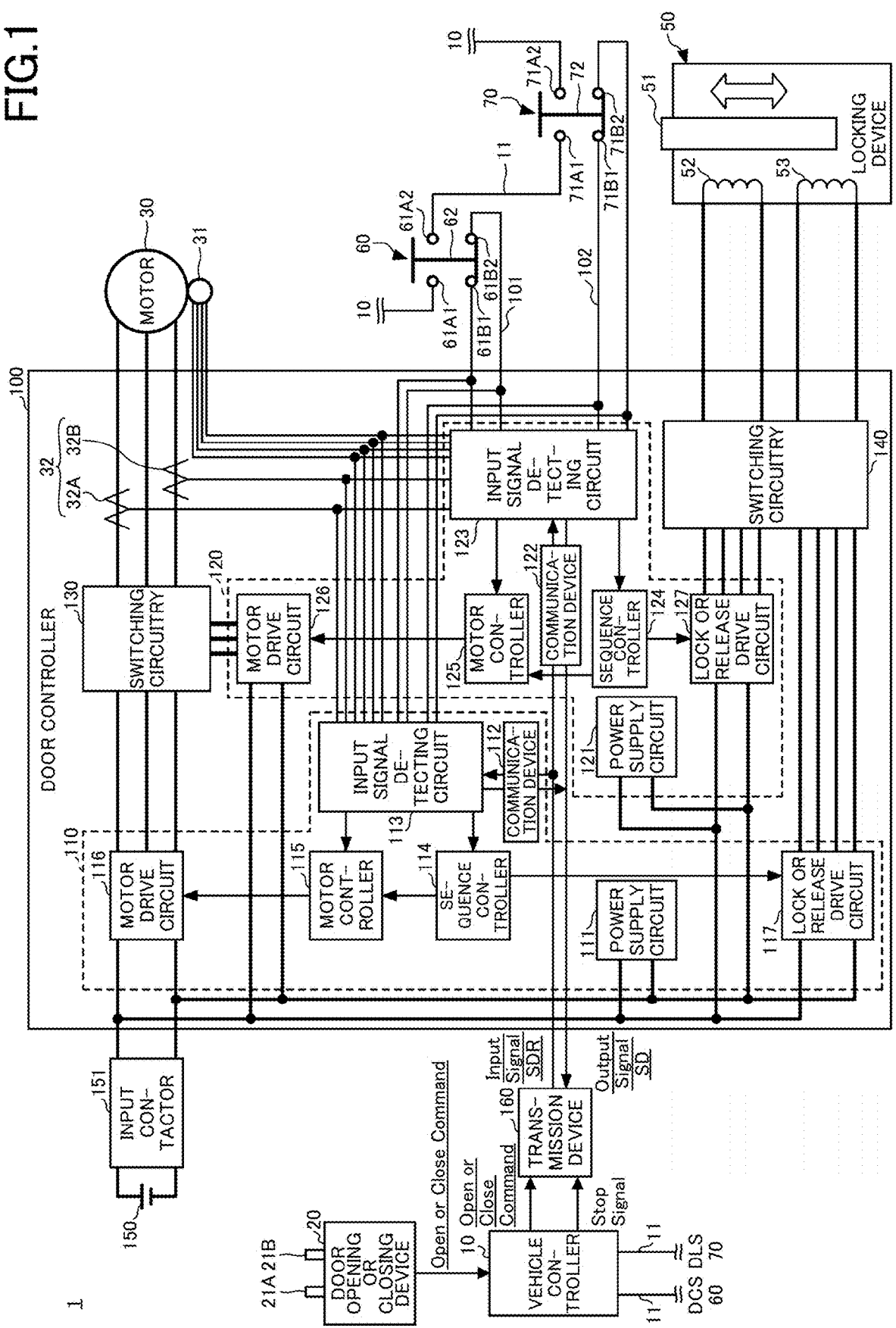
FIG. 1 is a block diagram illustrating an example of a configuration related to a door opening or closing operation of a railway vehicle.
Figure 2:
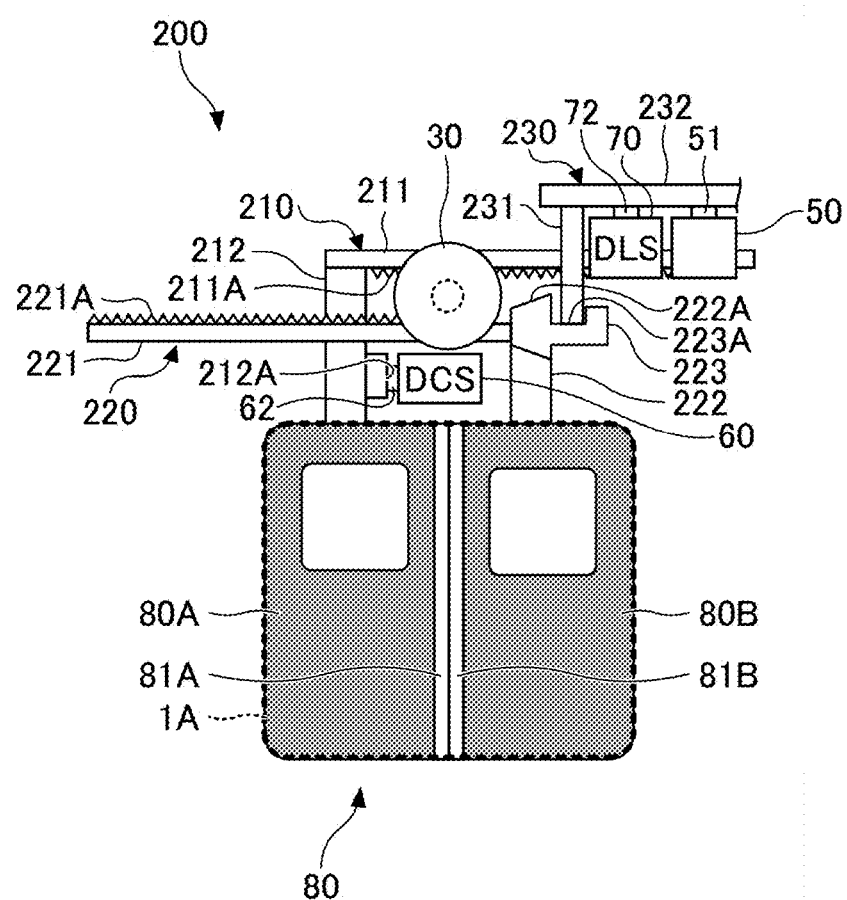
FIG. 2 is a schematic diagram illustrating an example of arrangement and configuration of a door and a door drive mechanism of the railway vehicle.
Figure 3:
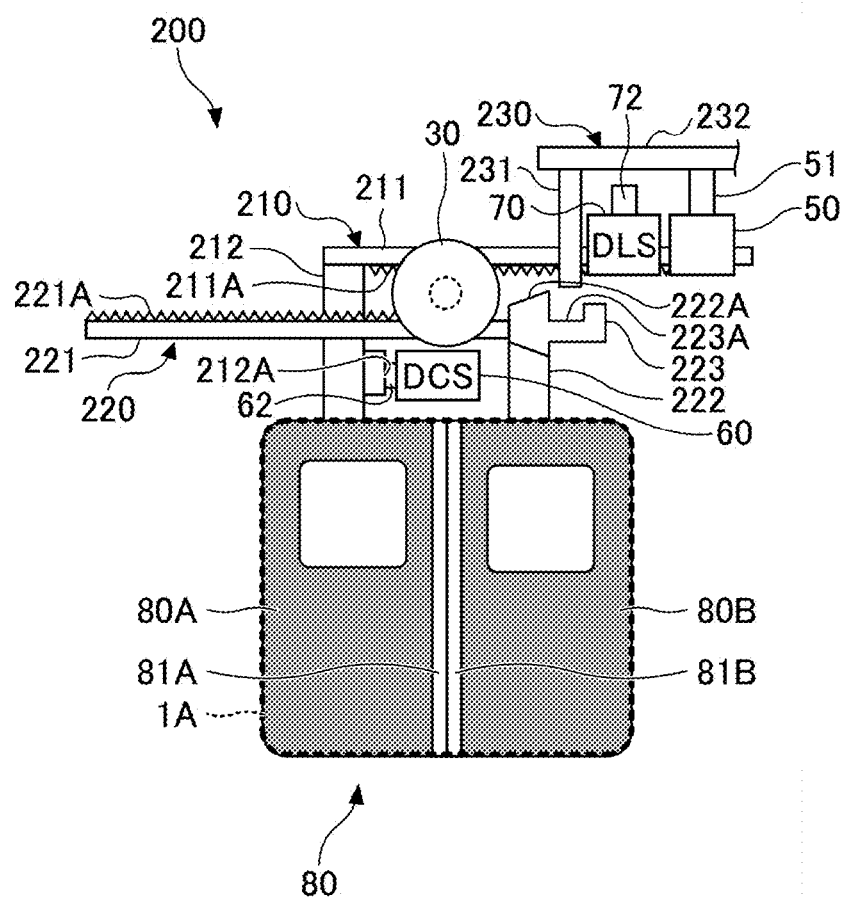
FIG. 3 is a schematic diagram illustrating the example of the arrangement and configuration of the door and the door drive mechanism of the railway vehicle.
Figure 4:
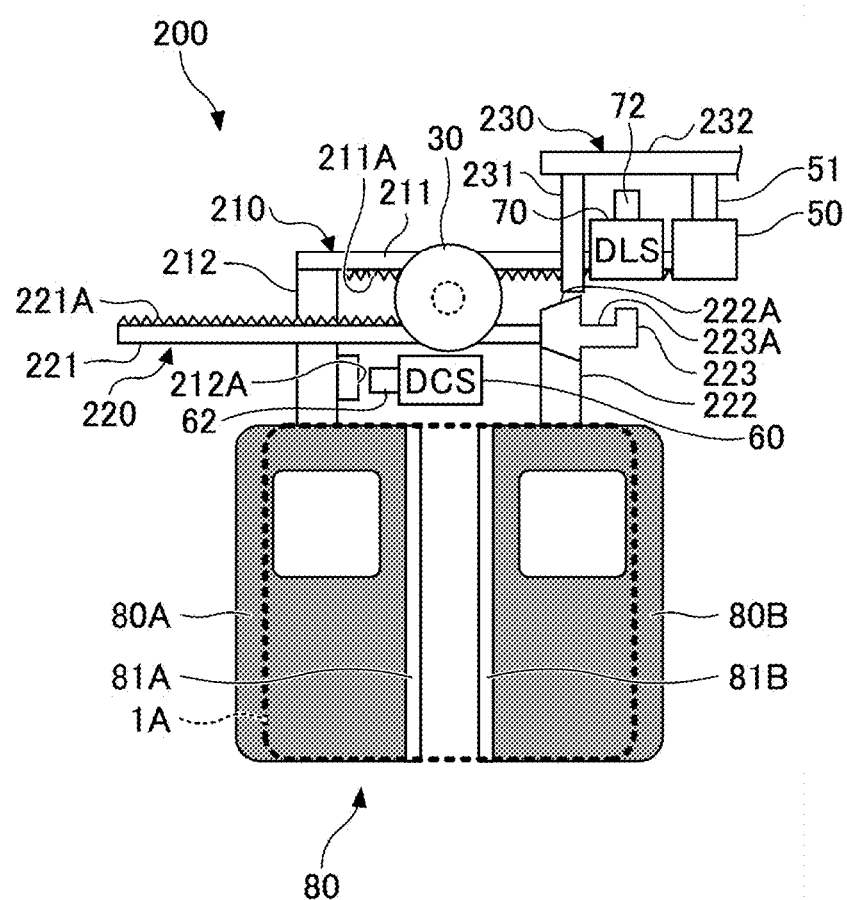
FIG. 4 is a schematic diagram illustrating the example of the arrangement and configuration of the door and the door drive mechanism of the railway vehicle.
Figure 5:
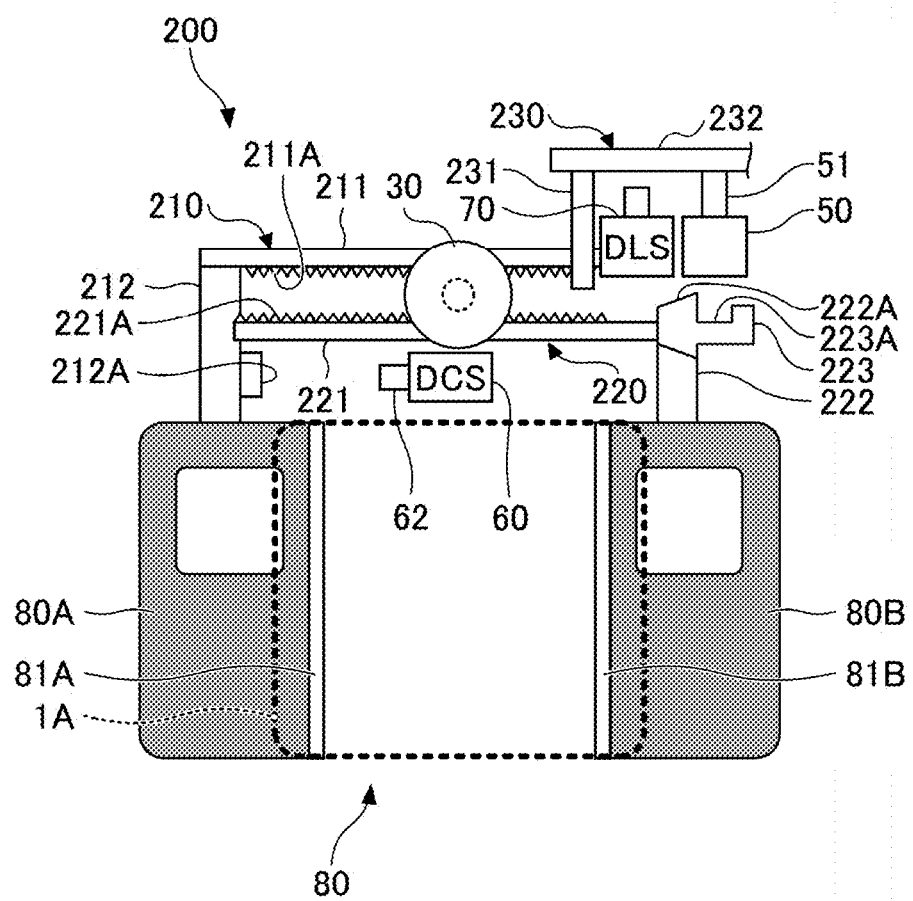
FIG. 5 is a schematic diagram illustrating the example of the arrangement and configuration of the door and the door drive mechanism of the railway vehicle.
Figure 6:
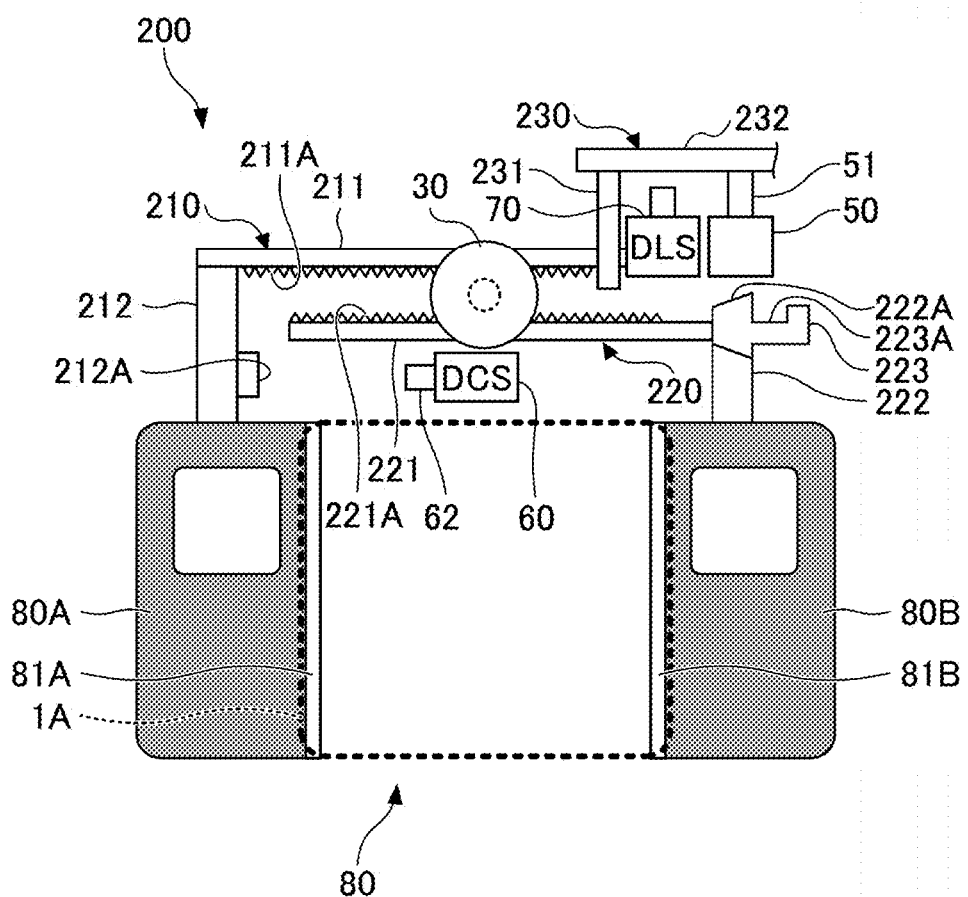
FIG. 6 is a schematic diagram illustrating the example of the arrangement and configuration of the door and the door drive mechanism of the railway vehicle.

FIG. 1 is a block diagram illustrating an example of the configuration related to the opening or closing operation of the door 80 of the railway vehicle 1. FIG. 2 through FIG. 6 are schematic diagrams illustrating an example of arrangement and configuration of the door 80 and a door drive mechanism 200 of the railway vehicle 1. More particularly, FIG. 2 is a schematic diagram illustrating the door 80 and the door drive mechanism 200 in a fully closed and locked state of the door 80. FIG. 3 is a schematic diagram illustrating the door 80 and the door drive mechanism 200 in a fully closed and released state. FIG. 4 is a schematic diagram illustrating the door 80 and the door driving mechanism 200 during an opening operation (immediately after start of the opening operation) or a closing operation (immediately before the completion of the closing operation). FIG. 5 is a schematic diagram illustrating the door 80 and the door driving mechanism 200 during an opening operation (immediately before completion of the opening operation) or a closing operation (immediately after start of the closing operation). FIG. 6 is a schematic diagram illustrating the door 80 and the door drive mechanism 200 in a fully open state.

As illustrated in FIG. 1 through FIG. 6, the railway vehicle 1 includes a vehicle controller 10, a door opening or closing device 20, a motor 30, an encoder 31, a current sensor 32, a locking device 50, a Door Close Switch (DCS) 60, a Door Lock Switch (DLS) 70, and the door 80. The railway vehicle 1 also includes a door controller 100, a battery 150, an input contactor 151, a transmission device 160, and the door drive mechanism 200.

The vehicle controller 10 controls the operation of the railway vehicle 1. In the case of a multiple-car train including multiple railway vehicles 1 that are coupled, for example, one vehicle controller 10 is provided in each of a driver's cab of the first railway vehicle 1, and a conductor's cab of the last railway vehicle 1. In addition, in the case of a single-car train, for example, one vehicle controller 10 is provided in each of the driver's cab and the conductor's cab located at a front end and a rear end of the railway vehicle 1, respectively.

The vehicle controller 10 outputs a stop signal indicating that the railway vehicle 1 is stopped at a station or the like, to the door controller 100. Further, the vehicle controller 10 outputs an open command indicating the opening operation of the door 80, or a close command indicating the closing operation of the door 80, which is input from the door opening or closing device 20, to the door controller 100.

The vehicle controller 10 is connected to a wiring 11 which transmits an interlock signal. Both ends of the wiring 11 are connected to the vehicle controller 10, and the DCS 60 and the DLS 70 are provided on the wiring 11. When both the DCS 60 and the DLS 70 are in an on state, the wiring 11 is in a conduction state, and the interlock signal has a high (H) level. The vehicle controller 10 determines that the railway vehicle 1 is in a state capable of running when the interlock signal has the H level. In other words, the railway vehicle 1 becomes capable of running, when the interlock signal makes a transition from a low (L) level to the H level.

The door opening or closing device 20 is used by a train crew (for example, a conductor) of the railway vehicle 1, in order to perform the opening or closing operation of the door 80. The door opening or closing device 20 includes an open switch 21A, and a close switch 21B. For example, when the open switch 21A is operated while the railway vehicle 1 is stopped, the door opening or closing device 20 outputs an open command, which rises from the L level to the H level, to the vehicle controller 10. For example, when the close switch 21B is operated while the railway vehicle 1 is stopped, the door opening or closing device 20 outputs a close command, which falls from the H level to the L level, to the vehicle controller 10.

The motor 30 opens and closes the door 80 by driving the door 80. The motor 30 is a rotor driven by three-phase AC driving power, for example.

The door 80 may be driven by a linear motor driven by the three-phase AC driving power, or by a DC motor.

The encoder 31 detects a rotational position (rotation angle) of a rotational shaft of the motor 30. The encoder 31 detects the rotational position (rotation angle) and a speed of rotation during one revolution of the rotational shaft of the motor 30, for example. The encoder 31 outputs a detection signal including information related to the rotational position of the rotational shaft of the motor 30, and the detection signal is captured by the door controller 100. Hence, the door controller 100 can acquire position information in an opening or closing direction of the door 80, based on the detection signal from the encoder 31. In other words, the information included in the detection signal from the encoder 31, corresponds to the position information of the door 80.

The current sensor 32 senses a current of the three-phase AC driving power supplied from the door controller 100 to the motor 30. The current sensor 32 includes current sensors 32A and 32B which sense currents in two of the three power lines of the U-phase, the V-phase, and the W-phase connecting between the door controller 100 and the motor 30. For example, the current sensor 32A senses the current of the power line of the U-phase, and the current sensor 32B senses the current of the power line of the W-phase. In addition, the current sensor 32 may include a current sensor which senses the current of the remaining power line. For example, as illustrated in FIG. 1, the current sensor 32 may be built into the door controller 100, or may be provided externally to the door controller 100. The sensed signals of the current sensor 32 (current sensors 32A and 32B) are captured by a regular system controller 110 and a standby system controller 120, which will be described later.

The locking device 50 locks or releases the door 80. The locking device 50 includes a pin 51, and coils 52 and 53, for example, and is implemented by a bi-directional (or two-way) self holding solenoid. The coils 52 and 53 are connected to the door controller 100, respectively.

The pin 51 of the locking device 50 protrudes from a housing of the locking device 50, when the coil 52 is energized by the door controller 100. In this case, a locking pin 230, which will be described later, moves in a releasing direction (or unlocking direction), to release (or unlock) the door 80. In addition, because the locking device 50 is the self holding type, the pin 51 continues to protrude from the housing of the locking device 50 even after the energizing of the coil 52 is canceled. Hence, it is possible to maintain the released state (or unlocked state) of the door 80.

The pin 51 of the locking device 50 is drawn into the housing of the locking device 50, when the coil 53 is energized by the door controller 100. In this case, the locking pin 230, which will be described later, moves in a locking direction, to lock the door 80. Moreover, because the locking device 50 is the self holding type, the pin 51 of the locking device 50 continues to be drawn into the housing of the locking device 50 even after the energizing of the coil 53 is canceled. Thus, it is possible to maintain the locked state of the door 80.

The DCS 60 (an example of a sensing circuitry or means) senses the open (or opened) or closed state of the door 80 of the railway vehicle 1. More particularly, the DCS 60 senses a fully closed state in which the door 80 of the railway vehicle 1 is fully closed. The DCS 60 is implemented by a limit switch which is pressed by an action of the door 80, when the door 80 moved to the fully closed position, for example.

The DCS 60 includes fixed contacts 61A1 and 61A2, fixed contacts 61B1 and 61B2, and a movable contact 62.

The fixed contacts 61A1 and 61A2 are arranged in series with the wiring 11, in a manner that segments the wiring 11. Hereinafter, the fixed contacts 61A1 and 61A2 may also be referred to as "A-contacts" of the DCS 60, for the sake of convenience.

The fixed contacts 61B1 and 61B2 are arranged in series with a wiring 101, in a manner that segments the wiring 101 having both ends thereof connected to the door controller 100. Hence, the door controller 100 can recognize an on or off state of the DCS 60, according to a H-level signal or a L-level signal indicating a conducting or non-conducting state of the fixed contacts 61B1 and 61B2, respectively. Hereinafter, the fixed contacts 61B1 and 61B2 may also be referred to as "B-contacts" of the DCS 60, for the sake of convenience.

The movable contact 62 moves in an axial direction (up-down direction in FIG. 1), to put either the fixed contacts 61A1 and 61A2 or the fixed contacts 61B1 and 61B2 to a conducting state. In a state where no external force is applied to the movable contact 62 of the DCS 60, the movable contact 62 puts the fixed contacts 61B1 and 61B2 in the conducting state, that is, the B-contacts are put into the on state, and the A-contacts are put into the off state. On the other hand, when the movable contact 62 of the DCS 60 is pressed by the action of the door 80, as will be described later, the movable contact 62 puts the fixed contacts 61A1 and 61A2 in the conducting state, that is, the A-contacts are put into the on state, and the B-contacts are put into the off state. Then, when the DCS 60 returns to the state where the movable contact 62 is not pressed by the action of the door 80, the movable contact 62 puts the fixed contacts 61B1 and 61B2 in the conducting state, that is, the B-contacts are put into the on state, and the A-contacts are put into the off state.

For example, the door controller 100 can recognize the on or off state of the B-contacts of the DCS 60, based on the signal input via the wiring 101. Further for example, the door controller 100 can recognize the on or off state of the A-contacts of the DCS 60, by inverting the signal input via the wiring 101.

Hereinafter, an on state of the DCS 60 refers to the on state of the A-contacts of the DCS 60 (that is, the off state of the B-contacts), and an off state of the DCS 60 refers to the off state of the A-contacts of the DCS 60 (that is, the on state of the B-contacts). In other words, the on state of the DCS 60 indicates a fully closed state where the door 80 is fully closed, and the off state of the DCS 60 indicates an open state where the door 80 is open.

The DLS 70 (an example of a sensing circuitry or means) senses whether or not the door 80 is locked. More particularly, the DLS 70 senses the locked state of the door 80. The DLS 70 is implemented by a limit switch which is pressed by the action of the locking pin 230, when the locking pin 230 of the door 80 moves to a locked position, for example.

The DLS 70 includes fixed contacts 71A1 and 71A2, fixed contacts 71B1 and 71B2, and a movable contact 72.

The fixed contacts 71A1 and 71A2 are arranged in series with the wiring 11, in a manner that segments the wiring 11. Hereinafter, the fixed contacts 71A1 and 71A2 may also be referred to as "A-contacts" of the DLS 70, for the sake of convenience.

The fixed contacts 71B1 and 71B2 are arranged in series with a wiring 102, in a manner that segments the wiring 102 having both ends thereof connected to the door controller 100. Hence, the door controller 100 can recognize an on or off state of the DLS 70, according to a H-level signal or a L-level signal indicating a conducting or non-conducting state of the fixed contacts 71B1 and 71B2, respectively. Hereinafter, the fixed contacts 71B1 and 71B2 may also be referred to as "B-contacts" of the DLS 70, for the sake of convenience.

The movable contact 72 moves in the axial direction (up-down direction in FIG. 1), to put either the fixed contacts 71A1 and 71A2 or the fixed contacts 71B1 and 71B2 to a conducting state. In a state where no external force is applied to the movable contact 72 of the DLS 70, the movable contact 72 puts the fixed contacts 71B1 and 71B2 in the conducting state, that is, the B-contacts are put into the on state, and the A-contacts are put into the off state. On the other hand, when the movable contact 72 of the DLS 70 is pressed by the action of the locking pin 230, the movable contact 72 puts the fixed contacts 71A1 and 71A2 in the conducting state, that is, the A-contacts are put into the on state, and the B-contacts are put into the off state. Then, when the DLS 70 returns to the state where the movable contact 72 is not pressed by the action of the locking pin 230, the movable contact 72 puts the fixed contacts 71B1 and 71B2 in the conducting state, that is, the B-contacts are put into the on state, and the A-contacts are put into the off state.

For example, the door controller 100 can recognize the on or off state of the B-contacts of the DLS 70, based on the signal input via the wiring 102. Further for example, the door controller 100 can recognize the on or off state of the A-contacts of the DLS 70, by inverting the signal input via the wiring 102.

Hereinafter, an on state of the DLS 70 refers to the on state of the A-contacts of the DLS 70 (that is, the off state of the B-contacts), and an off state of the DLS 70 refers to the off state of the A-contacts of the DLS 70 (that is, the on state of the B-contacts). In other words, the on state of the DLS 70 indicates a locked state where the door 80 is locked, and the off state of the DLS 70 indicates a released state (or unlocked state) where the door 80 is released (or unlocked).

When the door 80 is fully open and released, both the A-contacts of the DCS 60 and the A-contacts of the DLS 70 are put into the open state, the wiring 11 assumes the conducting state, and the interlock signal assumes the H level.

The door 80 is a bi-parting sliding door provided at an opening 1A located on the left and right sides of the railway vehicle 1. The door 80 includes doors 80A and 80B.

Door stop rubbers 81A and 81B are provided at portions of the doors 80A and 80B respectively abutting each other in the fully closed state of the door 80. The door stop rubbers 81A and 81B are provided in a range extending from a top end to a bottom end, respectively, at mating portions of the doors 80A and 80B.

The door controller 100 (an example of a monitoring apparatus) controls the opening or closing operation of the door 80. The door controller 100 is provided for each of a plurality of doors 80 provided in railway vehicle 1.

Functions of the door controller 100 may be realized by arbitrary hardware an arbitrary combination of hardware and software. The door controller 100 may be generally formed by a computer including a processor such as a Central Processing Unit (CPU) or the like, a memory device such as a Random Access Memory (RAM) or the like, an auxiliary storage device such as a Read Only Memory (ROM) or the like, and an interface device configured to input and output signals, data, and commands between the computer and an external device.

The door controller 100 includes the regular system controller 110, the standby system controller 120, a switching circuitry 130, and a switching circuitry 140.

The regular system controller 110 controls the opening or closing operation of the door 80. The regular system controller 110 includes a power supply circuit 111, a communication device 112, an input signal detecting circuit 113, a sequence controller 114, a motor controller 115, a motor drive circuit 116, and a lock or release drive circuit 117.

The power supply circuit 111 functions as a driving power source for various devices of the regular system controller 110. The power supply circuit 111 uses the power of a relatively high voltage (for example, 100 V) supplied from the battery 150 to the door controller 100, to generate power of a relatively low voltage (for example, 5 V or lower) for driving devices of the regular system controller 110.

The communication device 112 performs two-way communication with the transmission device 160 which is provided externally to the door controller 100.

The input signal detecting circuit 113 (an example of a signal detecting circuit) detects various input signals input from the outside of the door controller 100.

In addition, the input signal detecting circuit 113 performs various signal processing based on the detected input signals.

For example, when the input signal detecting circuit 113 detects predetermined signals from the input signals, the input signal detecting circuit 113 transmits the predetermined signals to the sequence controller 114 and the motor controller 115. In other words, the input signal detecting circuit 113 extracts (or selects) the signals required for the control of the sequence controller 114 and the motor controller 115, from the plurality of kinds of input signals, and transmits the extracted (or selected) signals to the sequence controller 114 and the motor controller 115. Accordingly, the sequence controller 114 can appropriately perform a sequence control which will be described later, and the motor controller 115 can appropriately drive and control the motor 30, based on the signals input from the input signal detecting circuit 113.

For example, the input signal detecting circuit 113 determines an abnormality in the configuration related to the opening or closing operation of the door 80, based on the detected signals (refer to FIG. 9, FIG. 10, FIG. 20, and FIG. 21, which will be described later). An input signal detecting circuit 123, which will be described later, may similarly determine the abnormality in the configuration related to the opening or closing operation of the door 80.

The determination related to the abnormality includes determination of the presence or absence of the abnormality, determination (or identification) of a constituent element having the abnormality, determination of the extent of the abnormality, determination of the content (or type) of the abnormality, or the like.

The sequence controller 114 performs the sequence control related to the opening or closing operation of the door 80, based on the signals input from the input signal detecting circuit 113. More particularly, the sequence controller 114 performs the sequence control related to the opening or closing operation of the door 80, according to a stop signal, an open command, a close command, or the like from the vehicle controller 10. In addition, the sequence controller 114 performs the sequence control related to the opening or closing operation of the door 80, while determining the open or closed state of the door 80, the position of the door 80 in the opening or closing direction, the locked or released (or unlocked) state of the door 80, or the like, using the signals from the encoder 31, the DCS 60, the DLS 70, or the like.

The motor controller 115 drives and controls the motor 30 to perform an opening or closing operation of the door 80 corresponding to a control command, according to the control command, related to the opening or closing operation of the door 80, received from the sequence controller 114. The motor controller 115 generates a Pulse Width Modulation (PWM) signal which drives the motor 30, based on a velocity command and a thrust command for the motor 30, for example, which are input from the sequence controller 114, and outputs the PWM signal to the motor drive circuit 116. More particularly, the motor controller 115 may generate the PWM signal which is in conformance with the velocity command and the thrust command, while ascertaining the current, the rotational position of the rotational shaft, or the like of the motor 30, using the detection signals from the encoder 31, the current sensor 32, or the like which are input from the input signal detecting circuit 113.

The motor drive circuit 116 generates and outputs three-phase AC power for driving the motor 30, using the DC power input from the battery 150. The motor drive circuit 116 is configured to include an inverter circuit, for example. In the motor drive circuit 116, two DC power lines at an input side thereof are connected to the battery 150 via the input contactor 151, and three power lines at an output side thereof are connected to the motor 30 via the switching circuitry 130.

The lock or release drive circuit 117 energizes the coils 52 and 53 of the locking device 50 according to a lock command or an release (or unlock) command input from the sequence controller 114, to drive the locking device 50 (pin 51) in the locking direction or the releasing direction of the door 80. A pair of DC power lines including a positive line and a negative line, at an input side of the lock or release drive circuit 117, is connected to the battery 150 via the input contactor 151. Further, one of two pairs of DC power lines, respectively including a positive line and a negative line, at an output side of the lock or release drive circuit 117, is connected to the coil 52 via the switching circuitry 140, while the other of the two pairs of DC power lines at the output side of the lock or release drive circuit 117 is connected to the coil 53 via the switching circuitry 140. For example, the lock or release drive circuit 117 includes a semiconductor switch which can switch between electrically connecting and electrically disconnecting between the pair of DC power lines at the input side, and each of one of the pairs of DC power lines at the output side, and the other of the pairs of DC power lines at the output side thereof, and switches the semiconductor device between on and off states. More particularly, when the lock command is input from the sequence controller 114, the lock or release drive circuit 117 may switch to the state electrically connecting between the pair of DC power lines at the input side and one of the pairs of DC power lines at the output side, and energize the coil 52 of the locking device 50 via the switching circuitry 140. In addition, when the release command is input from the sequence controller 114, the lock or release drive circuit 117 may switch to the state electrically connecting between the pair of DC power lines at the input side and the other of the pairs of DC power lines at the output side, and energize the coil 53 of the locking device 50 via the switching circuitry 140.

The standby system controller 120 is configured to control the opening or closing operation of the door 80, and can perform a backup function of the regular system controller 110. Accordingly, because the door controller 100 is provided with the standby system controller 120 in addition to the regular system controller 110, redundancy of the control system related to the opening or closing operation of the door 80 can be achieved. More particularly, when an abnormality is generated in the regular system controller 110, the standby system controller 120 controls the opening or closing operation of the door 80 in place of the regular system controller 110.

The standby system controller 120 includes constituent elements similar to those of the regular system controller 110. More particularly, the standby system controller 120 includes a power supply circuit 121, a communication device 122, an input signal detecting circuit 123 (an example of a signal detecting circuit), a sequence controller 124, a motor controller 125, a motor drive circuit 126, and a lock or release drive circuit 127.

The hardware configuration and functions of the power supply circuit 121, the communication device 122, the input signal detecting circuit 123, the sequence controller 124, the motor controller 125, the motor drive circuit 126, and the lock or release drive circuit 127 of the standby system controller 120 are similar to those of the power supply circuit 111, the communication device 112, the input signal detecting circuit 113, the sequence controller 114, the motor controller 115, the motor drive circuit 116, and the lock or release drive circuit 117 of the regular system controller 110, respectively. For this reason, a detailed description of the hardware configuration and functions of the standby system controller 120 will be omitted.

The switching circuitry 130 switches between a state where the motor drive circuit 116 and the motor 30 are electrically connected, and a state where the motor drive circuit 126 and the motor 30 are electrically connected. More particularly, three-phase AC output power lines of the motor drive circuit 116 and the motor drive circuit 126, are connected to the input side of the switching circuitry 130, respectively, and a three-phase AC input power line extending from the motor 30 is connected to the output side of the switching circuitry 130. The switching circuitry 130 switches between a state where the output power line of the motor drive circuit 116 and the input power line of the motor 30 are electrically connected, and a state where the output power line of the motor drive circuit 126 and the input power line of the motor 30 are electrically connected.

The switching circuitry 130 maintains the state where the motor drive circuit 116 and the motor 30 are electrically connected, when the control related to the opening or closing operation of the door 80 is performed by the regular system controller 110. On the other hand, the switching circuitry 130 switches to the state where the motor drive circuit 126 and the motor 30 are electrically connected, when the abnormality is generated in the regular system controller 110, and the control related to the opening or closing operation of the door 80 is performed by the standby system controller 120.

The switching circuitry 140 switches between a state where the lock or release drive circuit 117 and the locking device 50 (coils 52 and 53) are connected, and a state where the lock or release drive circuit 127 and the locking device 50 (coils 52 and 53) are connected. More particularly, two pairs of output power lines of the lock or release drive circuit 117 and the lock or release drive circuit 127, respectively, are connected to an input side of the switching circuitry 140, and two pairs of input power lines extending from the locking device (coils 52 and 53) are connected to an output side of the switching circuitry 140. The switching circuitry 140 switches between a state where the two pairs of output power lines of the lock or release drive circuit 117 and the two pairs of input power lines of the locking device 50 are connected, a state where the two pairs of output power lines of the lock or release drive circuit 127 and the two pairs of input power lines of the locking device 50 are connected.

The switching circuitry 140 maintains the state where the lock or release drive circuit 117 and the locking device 50 (coils 52 and 53) are electrically connected, when the control related to the opening or closing operation of the door 80 is performed by the regular system controller 110. On the other hand, the switching circuitry 140 switches to the state where the lock or release drive circuit 127 is electrically connected to the locking device 50 (coils 52 and 53), when the abnormality is generated in the regular system controller 110, and a transition is made to the state where the control related to the opening or closing operation of the door 80 is performed by the standby system controller 120.

The battery 150 is a condenser mounted in the railway vehicle 1. The battery 150 supplies DC power of a predetermined voltage (for example, 100 volts) to various devices (or components) of the railway vehicle 1, including the motor 30, locking device 50, and the door controller 100.

The input contactor 151 is provided in a power circuit between the battery 150 and the various devices including the door controller 100, to switch the power supply to the various devices of the railway vehicle 1 between on and off states by opening or closing (that is, turning on or off) the power circuit. The input contactor 151 is closed according to a predetermined operation corresponding to a power on in the driver's cab of the railway vehicle 1, for example. In this case, the power supply to the various devices of the railway vehicle 1, including the door controller 100, is started, to start the railway vehicle 1. In addition, the input contactor 151 is opened according to a predetermined operation corresponding to a power off in the driver's cab of the railway vehicle 1, for example. In this case, the power supply to the various devices of the railway vehicle 1, including the door controller 100, is stopped (cut off), to stop the railway vehicle 1.

The transmission device 160 provides a signal relay function between the door controller 100 of each of the plurality of doors 80 of the railway vehicle 1, and the vehicle controller 10.

The transmission device 160 receives various signals transmitted from the vehicle controller 10 toward the door controller 100, and transmits the various signals (input signal SDR) to each of the door controllers 100. In addition, the transmission device 160 receives various signals (output signal SD) transmitted from each of the door controllers 100, and transmits the various signals to the vehicle controller 10.

The door drive mechanism 200 transmits power of the motor 30 to the door 80, and causes the door 80 to perform the opening or closing operation. Further, the door drive mechanism 200 also provides a locked state and a released (or unlocked) state of the door 80, according to the operation of the locking device 50 (pin 51).

The door drive mechanism 200 includes racks 210 and 220, and the locking pin 230.

The rack 210 is mounted on a top end of the door 80A. The rack 210 includes a rack portion 211, and a connecting portion 212.

The rack portion 211 is a member that extends in a horizontal direction, more particularly, in a front-back direction of the railway vehicle 1. A rack gear 211A is provided on a lower surface of the rack portion 211. A rotational shaft of the rack portion 211 is arranged above an opening 1A of the railway vehicle 1, at a position slightly above the rotational shaft of the motor 30 arranged in a width direction (left-right direction) of the railway vehicle 1. Hence, a pinion gear, arranged coaxially with the rotational shaft of the motor 30, can engage the rack gear 211A on the lower surface of the rack portion 211. For this reason, it is possible to move the rack portion 211 the front-back direction of the railway vehicle 1, according to the rotation of the motor 30.

The connecting portion 212 connects the door 80A and the rack portion 211. The connecting portion 212 extends upward from the upper end of the door 80A, and the rack portion 211 is connected to an upper end of the connecting portion 212. Accordingly, the door 80A moves in the front-back direction of the railway vehicle 1, linked with a movement of the rack portion 211 according to the rotation of the motor 30, thereby performing the opening or closing operation of the door 80.

The connecting portion 212 includes a DCS abutting portion 212A on the center side of the opening 1A in the front-back direction of the railway vehicle 1. As illustrated in FIG. 2 and FIG. 3, when the door 80A makes a transition to the fully closed state, the DCS abutting portion 212A abuts the movable contact 62 of the DCS 60 and the movable contact 62 presses against the movable contact 62. As a result, the movable contact 62 is pressed inward, thereby turning on the DCS 60. On the other hand, as illustrated in FIG. 4 through FIG. 6, when the door 80A makes a transition to a state other than the fully closed state, the DCS abutting portion 212A makes a transition to a state not abutting the movable contact 62, thereby turning off the DCS 60.

The rack 220 is mounted on the upper end of the door 80B. The rack 220 includes the rack portion 221, the connecting portion 212, and a locking pin abutting portion 223.

The rack portion 221 is a member that extends in the horizontal direction, more particularly, in the front-back direction of the railway vehicle 1. A rack gear 221A is provided on an upper surface of the rack portion 221. The rack portion 221 is arranged above the opening 1A of the railway vehicle 1, at a position slightly below the rotational shaft of the motor 30. Accordingly, it is possible to engage a pinion gear arranged coaxially with the rotational shaft of the motor 30, with the rack gear 211A on the upper surface of the rack portion 221. For this reason, the rack portion 221 can be moved in the front-back direction of the railway vehicle 1 according to the rotation of the motor 30.

A connecting portion 222 connects the door 80B and the rack portion 221. The connecting portion 222 is provided to extend upward from the upper end of the door 80B, and the rack portion 221 is connected to an upper end of the connecting portion 222. Accordingly, the door 80B moves in the front-back direction of the railway vehicle 1, linked with a movement of the rack portion 221 according to the rotation of the motor 30, thereby performing the opening or closing operation of the door 80. In addition, when the rack gear 211A engages the pinion gear coaxial with the motor 30 from above, and the rack gear 221A engages the pinion gear coaxial with the motor 30 from below, it is possible to move the racks 210 and 220 in opposite directions according to the rotation of the motor 30. For this reason, the opening operation and the closing operation of the two doors 80A and 80B can be performed using a single motor 30.

Moreover, a ramp 222A, which slopes downward toward the center side of the opening 1A in the front-back direction of the railway vehicle 1, is provided on an upper end of the connecting portion 222.

The locking pin abutting portion 223 abuts the locking pin 230 in the locked state of the door 80. With respect to the connecting portion 222, the locking pin abutting portion 223 protrudes in a direction opposite to the direction in which the rack portion 221 extends. The locking pin abutting portion 223 is provided with a locking hole 223A.

The locking hole 223A is a recess provided in an upper surface of the locking pin abutting portion 223. A lower end of the locking pin 230 (a pin portion 231 described below) is inserted into the locking hole 223A when the door 80 is locked.

The locking pin 230 is provided above the locking pin abutting portion 223 of the rack 220. The locking pin 230 includes the pin portion 231, and a locking device abutting portion 232.

The pin portion 231 is provided to extend in the up-down direction.

The locking device abutting portion 232 is mounted on an upper end of the pin portion 231, and is provided to extend horizontally from a connection portion thereof connecting to the pin portion 231, more particularly, in a direction opposite to the opening 1A in the front-back direction of the railway vehicle 1. The locking device 50 is fixedly arranged below the locking device abutting portion 232, and an upper end of the pin 51 of the locking device 50 abuts a lower surface of the locking device abutting portion 232. As a result, the locking device abutting portion 232 is raised in the upward direction, when the pin 51 of the locking device 50 protrudes in the upward direction, and the locking device abutting portion 232 is lowered in the downward direction due to the weight of the locking pin 230 itself, when the pin 51 of the locking device 50 is drawn inward in the downward direction.

As illustrated in FIG. 4 through FIG. 6, in a state where the pin 51 of the locking device 50 protrudes, the lower end of the pin portion 231, connected to the locking device abutting portion 232, is positioned above the ramp 222A of the rack 220, and the pin portion 231 does not engage the locking hole 223A. For this reason, the door 80 (doors 80A and 80B) is in a state moveable in the opening or closing direction, because the rack 220 is movable without being affected by the arrangement of the locking pin 230.

In contrast, as illustrated in FIG. 2 and FIG. 3, in a state where the pin 51 of the locking device 50 is drawn inward, the lower end of the pin portion 231 is positioned below the ramp 222A of the rack 220. In addition, in the fully closed state of the door 80, the pin portion 231 is positioned on the side of the locking pin abutting portion 223 than the ramp 222A, in the front-back direction of the railway vehicle 1. For this reason, when the pin 51 of the locking device 50 is drawn inward in the fully closed state of the door 80, the locking device abutting portion 232 moves downward, and the pin portion 231 engages the locking hole (or recess) 223A of the rack 220. Hence, the movement of the rack 220 is restricted, and the rotation of the pinion gear engaging the rack gear of the rack 220 is also restricted, thereby restricting the movement of the rack 210 having the rack gear 211A engaging the pinion gear. Accordingly, the movement of the doors 80A and 80B connected to the racks 210 and 220 is restricted, and the locked state of the doors 80A and 80B is realized.

[General Outline of Door Opening and Closing Operations]

Next, a general outline of the opening and closing operations of the door 80 will be described, with reference to FIG. 7 and FIG. 8, in addition to FIG. 2 through FIG. 6.

<Door Opening Operation>

Figure 7:
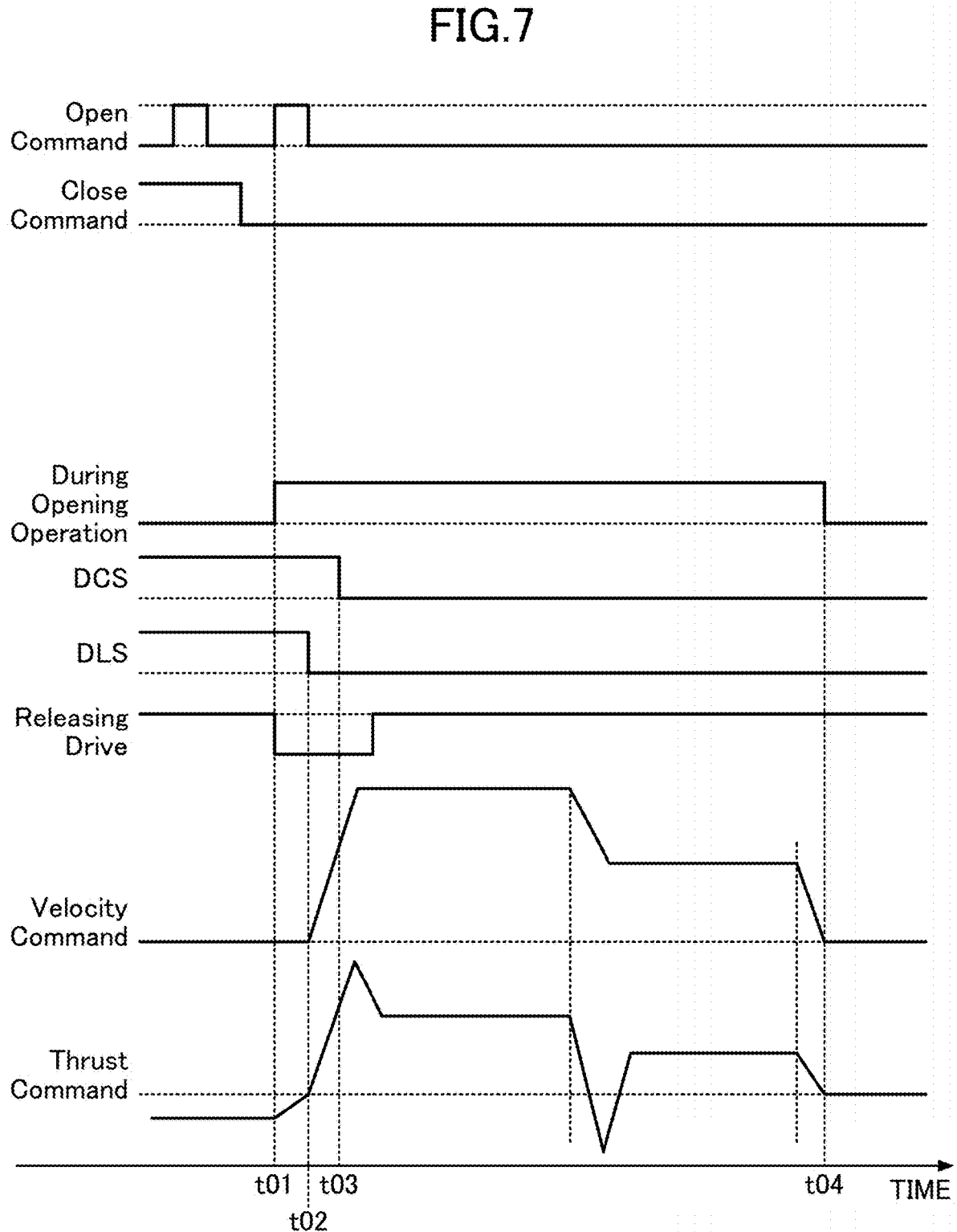
FIG. 7 is a timing chart illustrating an example of a door opening operation when the configuration related to the door opening or closing operation is normal.

FIG. 7 is a timing chart illustrating an example of the opening operation of the door 80 in a normal state of the configuration related to the opening or closing operation of the door 80. More particularly, FIG. 7 is a diagram illustrating the timing chart of an open command, a close command, an open signal, a during opening operation signal, a DCS signal, a DLS signal, a releasing (or unlocking) drive signal, a velocity command, and a thrust command during the opening operation of the door 80, including before and after the opening operation of the door 80.

The open command and the close command are command signals instructing the opening operation and the closing operation of the door 80, respectively, and are transmitted from the vehicle controller 10 to the door controller 100, as described above.

The during opening operation signal indicates whether or not the opening operation of the door 80 is being performed. The during opening operation signal has the H level during the opening operation of the door 80, and has the L level when the door 80 is not performing the door opening operation. For example, the during opening operation signal is generated by the input signal detecting circuit 113 or the input signal detecting circuit 123, and is transmitted to the sequence controller 114 and the motor controller 115.

The DCS signal and the DLS signal indicate the on or off state of the DCS 60 and the DLS 70, respectively. The DCS signal has the H level when the DCS 60 is in the on state, and the DLS signal has the H level when the DLS 70 is in the on state (more particularly, when the respective A-contact is on and the respective B-contact is off), and the DCS signal has the L level when the DCS 60 is in the off state, and the DLS signal has the L level when the DLS 70 is in the off state (more particularly, when the respective A-contact is off and the respective B-contact is on).

The releasing drive signal is a signal for driving the locking device 50 to release the lock. The releasing drive signal has the H level when not driving the locking device 50 to release the lock, and has the L level when driving the locking device 50 to release the lock. The releasing drive signal is generated by the sequence controllers 114 and 124, for example, and is transmitted to the lock or release drive circuits 117 and 127.

The velocity command and the thrust command are command values indicating the velocity and the thrust of the motor 30, respectively. The velocity command and the thrust command are generated by the motor controllers 115 and 125. In this example, the drive command and the thrust command for the motor 30 indicate a positive value for the rotational direction corresponding to the opening operation of the door 80, and indicate a negative value for the rotational direction corresponding to the closing operation of the door 80. The same applies to the examples illustrated in FIG. 8 and FIG. 11 through FIG. 18, which will be described later.

As illustrated in FIG. 7, when the open command is received after the railway vehicle 1 stops, the door controller 100 lowers the releasing drive signal to the L level, and raises the during opening operation signal to the H level, at a time t01. As a result, the locking device 50 is driven to be released (or unlocked), and the locking of the door 80 is released (refer to FIG. 2 and FIG. 3).

When the locking of the door 80 is released, the DLS signal falls from the H level indicating the locked state to the L level indicating the released (or unlocked) state, at a time t02.

After the locking of the door 80 is released, the door controller 100 relatively increases the velocity command and the thrust command for the motor 30, to start the opening operation of the door 80 (refer to FIG. 4). As a result, the DCS signal falls from the H level indicating the fully closed state, to the L level indicating the state other than the fully closed state, at a time t03.

The door controller 100 drives the motor 30 until the door 80 reaches the fully open state (refer to FIG. 5). When the door 80 reaches the fully open state (refer to FIG. 6), the door controller 100 sets the velocity command to zero, and lowers the during opening operation signal from the H level indicating during the opening operation, to the L level indicating other than during the opening operation, at a time t04.

<Door Closing Operation>

Figure 8:
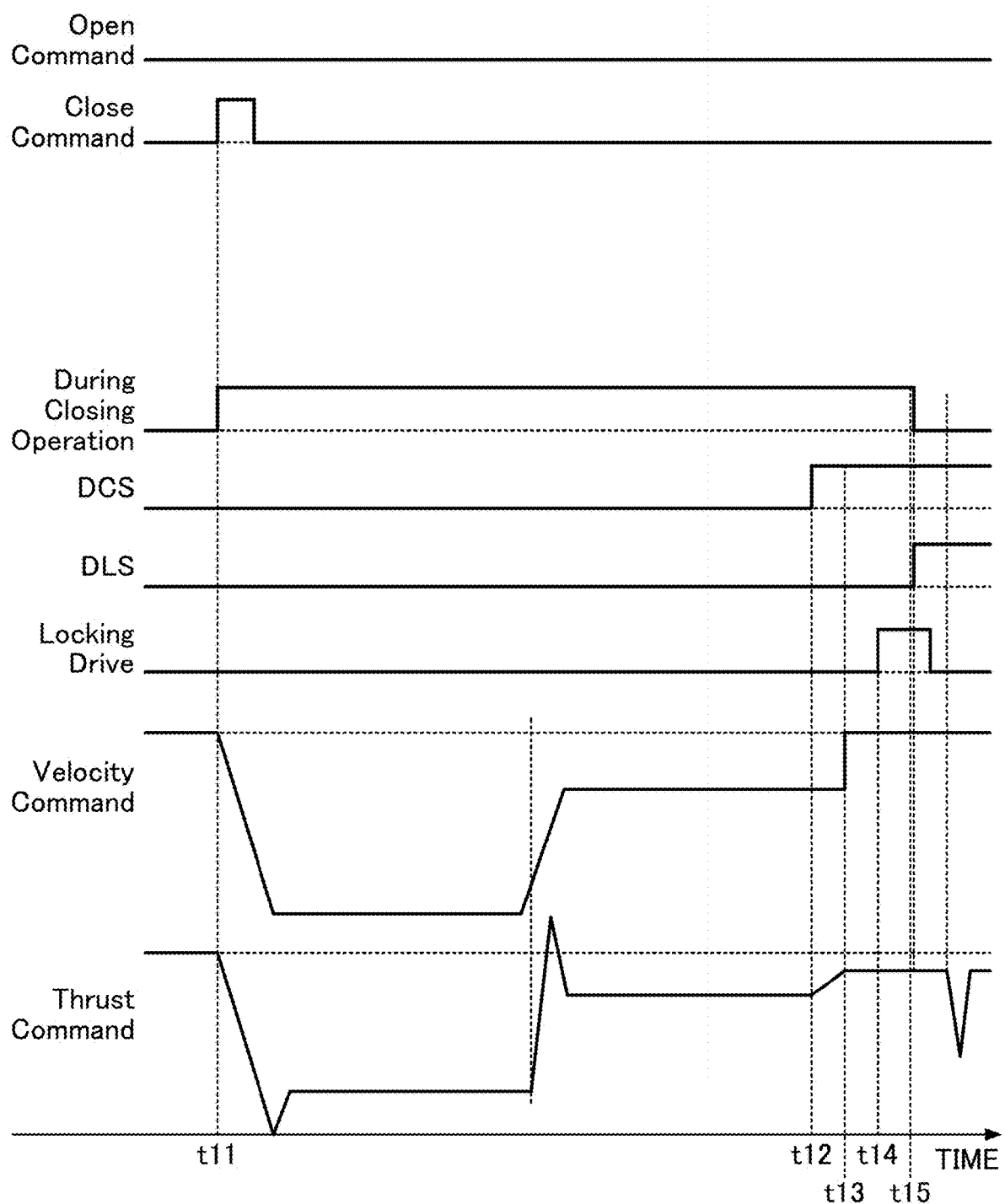
FIG. 8 is a timing chart illustrating the example of the door closing operation when the configuration related to the door opening or closing operation is normal.

FIG. 8 is a timing chart illustrating an example of the closing operation of the door 80 in the normal state of the configuration related to the opening or closing operation of the door 80. More particularly, FIG. 8 is a diagram illustrating the timing chart of the open command, the close command, the open signal, a during closing operation signal, the DCS signal, the DLS signal, the locking drive signal, the velocity command, and the thrust command during the closing operation of the door 80, including before and after the closing operation of the door 80.

The during closing operation signal indicates whether or not the closing operation of the door 80 is being performed. The during closing operation has the H level during the closing operation of the door 80, and has the L level when the door 80 is not performing the closing operation. For example, the during closing operation signal is generated by the input signal detecting circuit 113 or the input signal detecting circuit 123, similar to the during opening operation signal, and is transmitted to the sequence controller 114 and the motor controller 115.

The locking drive signal is a signal for driving the locking device 50 to lock. The locking drive signal has the L level when not driving the locking device 50 to lock, and has the H level when driving the locking device 50 to lock. The locking drive signal is generated by the sequence controllers 114 and 124, for example, similar to the releasing drive signal, and is transmitted to the lock or release drive circuits 117 and 127.

As illustrated in FIG. 8, when the close command is received in the fully open state of door 80 of the railway vehicle 1, the door controller 100 raises the during opening operation signal to the H level, at a time t11. Then, the door controller 100 relatively increases the velocity command and the thrust command (absolute values) of the motor 30, to start the closing operation of the door 80 (refer to FIG. 5 and FIG. 6).

The door controller 100 drives the motor 30 until the door 80 reaches the fully closed state (refer to FIG. 4). Then, when the door 80 reaches the fully closed state (refer to FIG. 3), the DCS signal rises from the L level to the H level, at a time t12.

When the DCS signal rises to the H level, the door controller 100 sets the velocity command to zero, at a time t13.

When the DCS signal rises to the H level, and the velocity command is set to zero, the door controller 100 raises the locking drive signal from the L level to the H level, at a time t14. As a result, the locking device 50 is driven to be locked, and the door 80 is locked (refer to FIG. 2 and FIG. 3).

When the locking device 50 is locked, the DLS signal rises from the L level to the H level, at a time t15. Then, the door controller 100 lowers the during closing operation signal from the H level to the L level.

In the fully closed state, the thrust command for the door 80 may be other than zero, and a relatively small thrust command, capable of pressing the door 80 in the closing direction to a certain extent, may be output at the time t13 or thereafter. In this case, even if some external force is applied to the door 80 before the door 80 is locked, the door controller 100 can restore the door 80 to the fully closed state, or cause the door 80 to maintain the fully closed state, for example.

[General Outline of Method for Determining Abnormality in Configuration Related to Door Opening or Closing Operation]

Next, a general outline of a method for determining an abnormality in the configuration related to the opening or closing operation of the door 80 will be described.

When the regular system controller 110 controls the opening or closing operation of the door 80, the regular system controller 110 determines an abnormality in the configuration related to the opening or closing operation of the door 80 while the railway vehicle 1 is running. For example, the determination of the abnormality may be performed by the input signal detecting circuit 113, as described above. In other words, the regular system controller 110 may function as a "monitoring apparatus", and in particular, the functions of the monitoring apparatus may be provided in the input signal detecting circuit 113.

Further, when the abnormality is generated in the regular system controller 110, and the standby system controller 120 controls the opening or closing operation of the door 80, in place of the regular system controller 110, the standby system controller 120 determines the abnormality in the configuration related to the opening or closing operation of the door 80, while the railway vehicle 1 is running. For example, the determination of the abnormality may be performed by the input signal detecting circuit 123, similar to the case of the regular system controller 110. In other words, the standby system controller 120 may also function as the "monitoring apparatus". More particularly, the functions of the monitoring apparatus may be provided in the input signal detecting circuit 123.

The method for determining the abnormality in the configuration related to the opening or closing operation of the door 80 is the same for when the opening or closing operation of the door 80 is controlled by the regular system controller 110, and for when the opening or closing operation of the door 80 is controlled by the standby system controller 120. Hereinafter, the method for determining the abnormality in the configuration related to the opening or closing operation of the door 80 will be described, mainly with reference to the case where the opening or closing operation of the door 80 is controlled by the regular system controller 110.

The regular system controller 110 (the input signal detecting circuit 113) determines the presence or absence of the abnormality in the configuration related to the opening or closing operation of the door 80, based on whether or not the signals input from the DCS 60 and the DLS 70 match the signals from the encoder 31.

For example, when the open or closed state of the door 80 indicated by the signal from the DCS 60 does not match an open or closed state of the door 80 anticipated at the position of the door 80 corresponding to the signals from the encoder 31, the input signal detecting circuit 113 determines that an abnormality is generated in the configuration related to the opening or closing operation of the door 80. More particularly, in this case, the input signal detecting circuit 113 may determine that the abnormality is generated in either the DCS 60 or the door controller 100.

This is because, when the abnormality is generated in the DCS 60, there is a possibility of outputting the signal indicating the open or closed state of the door 80 not anticipated at the position of the door 80 indicated by the signals from the encoder 31 (for example, the signal indicating the fully closed state of the door 80 even though the door 80 is at a position during the opening operation). Further, when the abnormality is generated in an input circuit or the like of the door controller 100 for receiving the signal from the DCS 60, there is a possibility of sensing the signal from the regular DCS 60, which is normal, as a different signal (for example, a H-level signal may be sensed as a L-level signal).

Similarly, when the locked or released state of the door 80 indicated by the signal from the DLS 70 does not match a locked or released state of the door 80 anticipated at the position of the door 80 corresponding to the signals from the encoder 31, the input signal detecting circuit 113 determines that an abnormality is generated in the configuration related to the opening or closing operation of the door 80. More particularly, in this case, the input signal detecting circuit 113 may determine that the abnormality is generated in any one of the locking device 50, the DLS 70, and the door controller 100.

This is because, when the abnormality is generated in the locking device 50, there is a possibility of outputting the signal indicating the locked or released state of the door 80 not anticipated at the position of the door 80 indicated by the signals from the encoder 31 (for example, the signal indicating the locked state of the door 80 even though the door 80 is at a position during the opening operation). In addition, when the abnormality is generated in the DLS 70, there is a possibility of outputting the signal indicating the locked or released state of the door 80 not anticipated at the position of the door 80 indicated by the signals from the encoder 31 (for example, the signal indicating the locked state of the door 80 even through the door 80 is at the position during the opening operation). Moreover, when the abnormality is generated in the input circuit or the like of the door controller 100 for receiving the signal from the DLS 70, for example, there is a possibility of sensing the signal from the regular DLS 70, which is normal, as a different signal.

Further, the input signal detecting circuit 113 may identify the constituent element including the abnormality, or determine the contents (or type) of the abnormality, based on results of determining the abnormality multiple times when performing the opening operation or closing operation of the door 80, including during the opening operation or the closing operation of the door 80.

For example, among abnormalities in the DCS 60 and DLS 70, abnormalities caused by deterioration are likely generated singly or intermittently, while fixed abnormalities in the DCS 60 and DLS 70 are likely to continue. For this reason, the input signal detecting circuit 113 may identify the contents (or type) of the abnormality in the DCS 60 and the DLS 70, based on the results of determining the abnormality multiple times using the property of the abnormality.

Further, between the abnormality in the DCS 60 and the abnormality in the door controller 100 (abnormality in the input circuit for receiving the signal from the DCS 60), for example, tendencies of the abnormalities, such as abnormality appearing patterns or the like, may be mutually different when the generation of the abnormalities are determined. Similarly, among the abnormality in the locking device 50, the abnormality in the DLS 70, and the abnormality in the door controller 100, for example, the tendencies of the abnormalities, such as the abnormality appearing patterns or the like, may be different from one another when the generation of the abnormalities are determined. For this reason, the input signal detecting circuit 113 may determine (or identify) the constituent element including the abnormality, from results of determining the abnormality multiple times, based on the tendencies or the like of the appearing abnormalities recognized in advance.

Example of Method for Determining Abnormality in Configuration Related to Opening or Closing Operation of Door Next, an example of a method for determining the abnormality in the configuration related to the opening or closing operation of the door 80 will be described, with reference to FIG. 9 and FIG. 10. More particularly, a specific example of the method for determining the abnormality in the configuration related to the opening or closing operation of the door 80 will be described on a precondition that the configuration illustrated in FIG. 1 is employed.

FIG. 9 and FIG. 10 are diagrams illustrating the example of the method for determining the abnormality in the configuration related to the door opening or closing operation of the door 80. More particularly, FIG. 9 and FIG. 10 illustrate the example of the method for determining the abnormality in the configuration related to the opening or closing operation of the door 80, when opening the door 80 (during opening of the door 80) and when closing the door 80 (during closing of the door 80).

Five states of the door 80, namely, "fully closed & locked", "fully closed & released", "start opening operation", "during opening operation", and "fully open" illustrated in FIG. 9, correspond to the states of the door 80 illustrated in FIG. 2, FIG. 3, FIG. 4, FIG. 5, and FIG. 6, respectively. Similarly, the five states of the door 80, namely, "fully open", "start closing operation", "during closing operation", "fully closed & released", and "fully closed & locked" illustrated in FIG. 10, correspond to the states of the door 80 illustrated in FIG. 6, FIG. 5, FIG. 4, FIG. 3, and FIG. 2, respectively.

As illustrated in FIG. 9, during opening of the door 80, the input signal detecting circuit 113 determines the presence or absence of the abnormality in the configuration related to the opening or closing operation of the door 80, during a time from the start of the opening operation of the door 80 until the fully open state of the door 80 is reached. More particularly, when opening the door 80, the input signal detecting circuit 113 determines the presence or absence of the abnormality in the configuration related to the opening or closing operation of the door 80, based on the signals from the DCS 60 and the DLS 70, when the signals from the encoder 31 indicate a position of the door 80 other than the fully closed state of the door 80.

During the opening of the door 80, the input signal detecting circuit 113 determines that the abnormality is generated in either the DCS 60 or the door controller 100, when the signal from the DCS 60 is in the on state (the A-contact is on, and the B-contact is off) in a state where the signals from the encoder 31 indicate a position other than the position in the fully closed position of the door 80. In addition, the input signal detecting circuit 113 may simply determine that the abnormality is generated in the DCS 60.

Similarly, during the opening of the door 80, the input signal detecting circuit 113 determines that the abnormality is generated in one of the locking device 50, the DLS 70, and the door controller 100, when the signal from the DLS 70 is in the on state (the A-contact is on, and the B-contact is off in a state where the signals from the encoder 31 indicates a position other than the position in the fully closed and locked state of the door 80. Further, the input signal detecting circuit 113 may simply determine that the abnormality is generated in either the locking device 50 or the DLS 70.

During the opening of the door 80, the input signal detecting circuit 113 does not determine the presence or absence of the abnormality in the configuration related to the opening or closing operation of the door 80 in the fully closed state of the door 80, for the following reasons. That is, even if the DCS 60 is in the off state indicating the open state of the door 80 in the fully closed state of the door 80, the interlock signal of the wiring 11 is at the L level, and thus, the railway vehicle 1 will not start running, and no problem occurs from the viewpoint of fail-safe. Similarly, even if the DLS 70 is in off state indicating the released state of the door 80 in the fully closed and locked state of the door 80, the interlock signal of the wiring 11 is at the L level, and thus, the railway vehicle 1 will not start running, and no problem occurs from the viewpoint of fail safe.

As illustrated in FIG. 10, during the closing of the door 80, the input signal detecting circuit 113 determines the presence or absence of the abnormality in the configuration related to the opening or closing operation of the door 80, during a time from the fully open state of the door 80 until the fully closed state of the door 80. In other words, when closing the door 80, the input signal detecting circuit 113 determines the presence or absence of the abnormality in the configuration related to the opening or closing operation of the door 80, based on the signals from the DCS 60 and the DLS 70, when the signals from the encoder 31 indicates the position other than the position in the fully closed state of the door 80.

More particularly, during the closing of the door 80, the input signal detecting circuit 113 determines that the abnormality is generated in either the DCS 60 or the door controller 100, when the signals from the encoder 31 indicate the position other than the position in the fully closed position of the door 80 and the signal from the DCS 60 is in the on state (the A-contact is on, and the B-contact is off). In addition, the input signal detecting circuit 113 may simply determine that the abnormality is generated in the DCS 60.

Similarly, during the closing of the door 80, the input signal detecting circuit 113 determines that the abnormality is generated in one of the locking device 50, the DLS 70, and the door controller 100, when the signal from the DLS 70 is the on state (the A-contact is on, and the B-contact is off) in a state where the signals from the encoder 31 indicate the position other than the position in the fully closed and locked state of the door 80. Moreover, the input signal detecting circuit 113 may simply determine that the abnormality is generated in either the locking device 50 or the DLS 70.

Similar to the case during the closing of the door 80 (FIG. 9), the input signal detecting circuit 113 does not determine the presence or absence of the abnormality in the configuration related to the opening or closing operation of the door 80 in the fully closed state of the door 80.

Accordingly, in this example, the door controller 100 can determine the presence or absence of the abnormality in the configuration related to the opening or closing operation of the door 80, based on the signals from the DCS 60 and the DLS 70, and the signals from the encoder 31.

The door controller 100 may acquire position information in the opening or closing direction of the door 80 from other devices capable of outputting position information in the opening or closing direction of the door 80, instead of from the encoder 31. For example, the door controller 100 may recognize position information in the opening or closing direction of the door 80, from image information of a cabin camera of the railway vehicle 1, capable of imaging the open or closed state of the door 80. Further, the encoder 31 may be omitted, and the motor controllers 115 and 125 may perform sensorless control of the motor 30. In this case, the motor controllers 115 and 125 may compute the position information in the opening or closing direction of the door 80 by estimation, and the door controller 100 may use the estimated position information in the opening or closing direction of the door 80, to determine the presence or absence of the abnormality in the configuration related to the opening or closing operation of the door 80. Moreover, the sequence controllers 114 and 124 may compute an elapsed time during the opening of the door 80 or during the closing of the door 80, and simply recognize the position information in the opening or closing direction of the door 80 from the computed elapsed time. In this case, the door controller 100 may use the position information in the opening or closing direction of the door 80, recognized from the computed elapsed time, to determine the presence or absence of the abnormality in the configuration related to the opening or closing operation of the door 80.

[Coping Strategy for Abnormality Generated in Configuration Related to Door Opening or Closing Operation]

Next, a coping strategy of the door controller 100 for the abnormality generated in the configuration related to the opening or closing operation of the door 80, will be described with reference to FIG. 11 through FIG. 18.

The coping strategy for the abnormality generated in the configuration related to the opening or closing operation of the door 80 is the same for when the control related to the opening or closing operation of the door 80 is performed by the regular system controller 110, and for when the control related to the opening or closing operation of the door 80 is performed by the standby system controller 120. Hereinafter, a description will be made on a precondition that the control of the door 80 is performed by the regular system controller 110.

<General Outline>

The door controller 100 may employ different coping strategies, based on frequency and continuity of the determination (abnormality detection) to determine the presence or absence of the abnormality in the configuration related to the opening or closing operation of the door 80.

In a case where the abnormality is detected in the configuration related to the opening or closing operation of the door 80, and the frequency of the abnormality detection is relatively low, for example, the regular system controller 110 causes a state where the doors 80A and 80B press against each other by the thrust of the motor 30 in the fully closed state (including the locked state) of the door 80, to continue. The frequency of the abnormality detection is regarded as being relatively low, when the number of times the abnormality is detected during a predetermined time, or within a predetermined number of abnormality detection attempts, is less than or equal to a predetermined reference, for example. The predetermined period and the predetermined number of abnormality detection attempts may be prescribed within a period of one opening and closing operation of the door 80, or may be prescribed within a period of multiple opening and closing operations of the door 80.

Similarly, in a case where the abnormality is detected in the configuration related to the opening or closing operation of the door 80, and the continuity of the state of the abnormality detection is relatively low, the regular system controller 110 causes a state where the doors 80A and 80B press against each other by the thrust of the motor 30 in the fully closed state of the door 80, to continue. The continuity of the state of the abnormality detection is regarded as being relatively low, when the state of the abnormality detection does not continue and exceed a predetermined time, or does not continue and exceed a predetermined number of times, for example. The predetermined time and the predetermined number of times may be prescribed within the period of one opening and closing operation of the door 80, or may be prescribed within the period of multiple opening and closing operations of the door 80.

Accordingly, when the frequency of the abnormality detection is relatively low, or the continuity of the state of the abnormality detection is relatively low, that is, in the case of a minor abnormality, the door controller 100 causes the state where the doors 80A and 80B press against each other in the fully closed state of the door 80, to continue, thereby ensuring safety of the door 80 while continuing the operation of the door 80.

On the other hand, in a case where the abnormality is detected in the configuration related to the opening or closing operation of the door 80, and the frequency of the abnormality detection is relatively high, for example, the regular system controller 110 switches the control entity related to the opening or closing operation of the door 80 to the standby system controller 120. The control related to the opening or closing operation of the door 80 is thereafter continued by the standby system controller 120. The frequency of the abnormality detection is regarded as being relatively high, when the number of times the abnormality is detected during the predetermined time, or within the predetermined number of abnormality detection attempts, exceeds the predetermined reference, for example.

Similarly, in a case where the abnormality is detected in the configuration related to the opening or closing operation of the door 80, and the continuity of the state of the abnormality detection is relatively high, the regular system controller 110 switches the control entity related to the opening or closing operation of the door 80 to the standby system controller 120. The continuity of the state of the abnormality detection is regarded as being relatively high, when the state of the abnormality detection continues and exceeds a predetermined time, or continues and exceeds a predetermined number of times, for example.

Accordingly, when the frequency of the abnormality detection (abnormality generation) is relatively high, or the continuity of the state of the abnormality detection is relatively high, that is, in the case of a major abnormality, the door controller 100 causes the regular system controller 110 to switch the control entity related to the opening or closing operation of the door 80 to the standby system controller 120, thereby ensuring safety of the door 80 while continuing the operation of the door 80.

In addition, the door controller 100 transmits an alert including a state of determining the presence of the abnormality of the door 80 (abnormality detection state) to the vehicle controller 10, via the transmission device 160, regardless of whether the abnormality is the minor abnormality or the major abnormality, for example.

Hence, the vehicle controller 10 can notify the state of the abnormality detection of the configuration related to the opening or closing operation of the door 80, via a predetermined output device in the driver's cab, the conductor's cab, or the like, for example, thereby urging early maintenance.

First Example of Abnormality Generation State During Door Opening Operation

Figure 11:
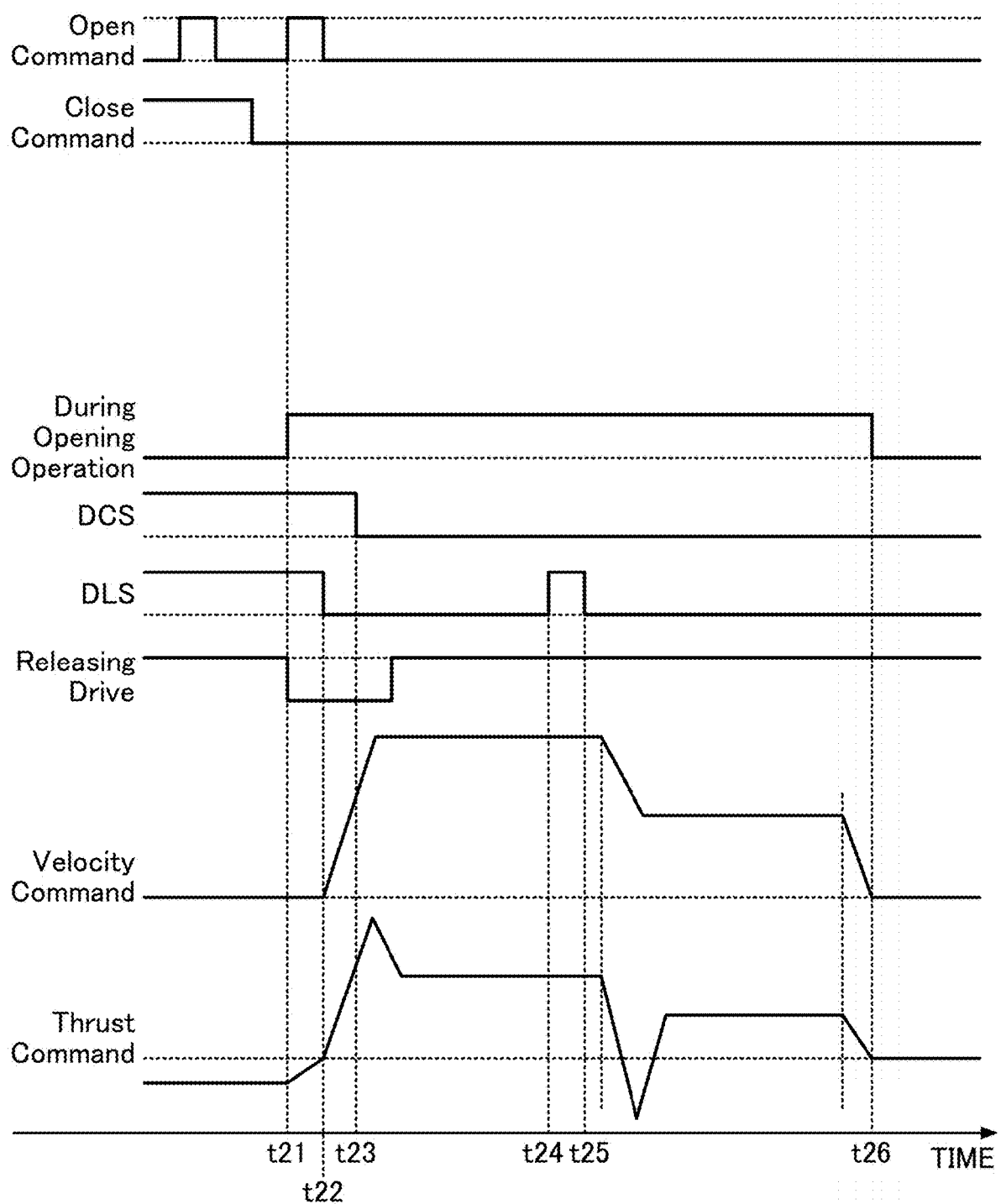
FIG. 11 is a timing chart illustrating a first example of the door opening operation when the configuration related to the door opening or closing operation is abnormal.

FIG. 11 is a timing chart illustrating a first example of the opening operation of the door 80 when the configuration related to the opening or closing operation of the door 80 is abnormal. More particularly, FIG. 11 is a diagram illustrating the timing chart of the open command, the close command, the during opening operation signal, the DCS signal, the DLS signal, the releasing drive signal, the velocity command, and the thrust command for a case where the abnormality is generated during the opening operation of the door 80, including before and after the opening operation of the door 80.

As illustrated in FIG. 11, the timing chart of FIG. 11 is the same as that of FIG. 7 except for the DLS signal, and times t21, t22, t23, and t26 correspond to the times t01, t02, t03, and t04 in FIG. 7, respectively. Hereinafter, a description will mainly be given with respect to the timing chart of the DLS signal.

The DLS signal rises from the L level (off state of the DLS 70) to the H level (on state of the DLS 70) at the open position of the door 80 at a time t24 after the opening operation of the door 80 is started. Accordingly, the door controller 100 can determine that the abnormality is generated in one of the locking device 50, the DLS 70, and the door controller 100 itself (more particularly, the input signal detecting circuit 113). In addition, the door controller 100 may determine that the abnormality is generated in either the locking device 50 or the DLS 70.

After rising to the H level, the DLS signal maintains the H-level state for a relatively short time, and falls to the L level at a time t25.

Thereafter, the door 80 reaches the fully open state, and the opening operation ends at the time t26.

In this example, the door controller 100 can determine that the frequency of the abnormality detection, or the continuity of the state of the abnormality detection, is relatively low. For this reason, when the door 80 thereafter reaches the fully closed state by the closing operation of the door 80, the door controller 100 may maintain the state where the doors 80A and 80B press against each other in the fully closed state of the door 80. Hence, the door controller 100 can ensure the safety of the door 80, while continuing the operation of the door 80, according to the state of the abnormality detection.

In addition, the door controller 100 may record, in an internal memory, such as the auxiliary storage device or the like, an abnormality log indicating that the abnormality related to the locking device 50, the DLS 70, the input signal detecting circuit 113, or the like, having the relatively low frequency or continuity, occurred. Hence, a person in charge of the maintenance of the railway vehicle 1 can utilize the abnormality log for maintenance of the railway vehicle 1 by checking the abnormality log ex post facto.

Further, the door controller 100 may transmit the abnormality log to the vehicle controller 10, via the transmission device 160. Hence, the vehicle controller 10 can notify the abnormality having the relatively low frequency or continuity, that is, the minor abnormality, to the crew of the train including the railway vehicle 1, via the predetermined output device, for example, and urge early maintenance.

Second Example of Abnormality Generation State During Door Opening Operation

Figure 12:
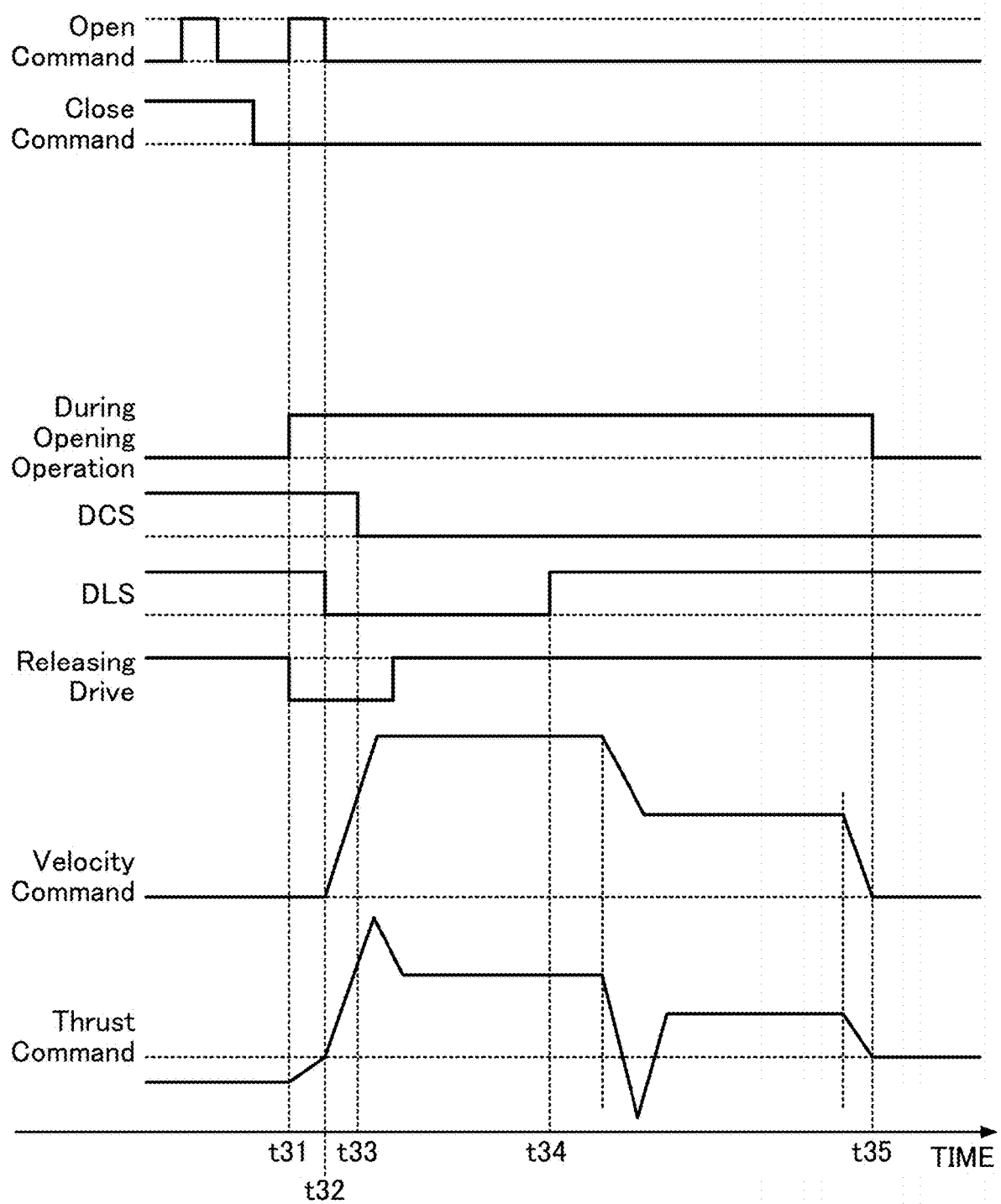
FIG. 12 is a timing chart illustrating a second example of the door opening operation when the configuration related to the door opening or closing operation is abnormal.

FIG. 12 is a timing chart illustrating a second example of the opening operation of the door 80 when the configuration related to the opening or closing operation of the door 80 is abnormal. More particularly, FIG. 12 is a diagram illustrating the timing chart of the open command, the close command, the during opening operation signal, the DCS signal, the DLS signal, the releasing drive signal, the velocity command, and the thrust command for the case where the abnormality is generated during the opening operation of the door 80, including before and after the opening operation of the door 80.

As illustrated in FIG. 12, the timing chart of FIG. 12 is the same as that of FIG. 7 except for the DLS signal, and times t31, t32, t33, and t35 correspond to the times t01, t02, t03, and t04 in FIG. 7, respectively. Hereinafter, a description will mainly be given with respect to the timing chart of the DLS signal.

The DLS signal rises from the L level (off state of the DLS 70) to the H level (on state of the DLS 70) at the position during the opening operation of the door 80 at a time t34 after the opening operation of the door 80 is started. Accordingly, the door controller 100 can determine that the abnormality is generated in one of the locking device 50, the DLS 70, and the door controller 100 itself (more particularly, the input signal detecting circuit 113). In addition, the door controller 100 may determine that the abnormality is generated in either the locking device 50 or the DLS 70.

Thereafter, the door 80 reaches the fully open state, and the opening operation ends at the time t35.

The DLS signal maintains the H-level state after the door 80 reaches the fully closed state, that is, after the opening operation ends.

In this example, the door controller 100 can determine that the frequency of the abnormality detection, or the continuity of the state of the abnormality detection, is relatively high. For this reason, the door controller 100 may switch the control entity of the opening or closing operation of the door 80 from the regular system controller 110 to the standby system controller 120 as soon as the door controller 100 determines that the frequency of the abnormality detection, or the continuity of the state of the abnormality detection, is relatively high, after completion of the opening operation of the door 80, or after completion of the closing operation of the door 80 performed thereafter. Accordingly, the door controller 100 can ensure the safety of the door 80, while continuing the operation of the door 80, according to the state of the abnormality detection.

In addition, the door controller 100 may transmit, to the vehicle controller 10 via the transmission device 160, an alert indicating that the frequency of the abnormality detection, or the continuity of the state of the abnormality detection in the locking device 50, the DLS 70, or the like, is relatively high. In this case, the vehicle controller 10 can notify the abnormality having the relatively high frequency or continuity, that is, the major abnormality, to the crew of the train including the railway vehicle 1, via the predetermined output device, for example, and strongly urge early maintenance.

Third Example of Abnormality Generation State During Door Opening Operation

Figure 13:
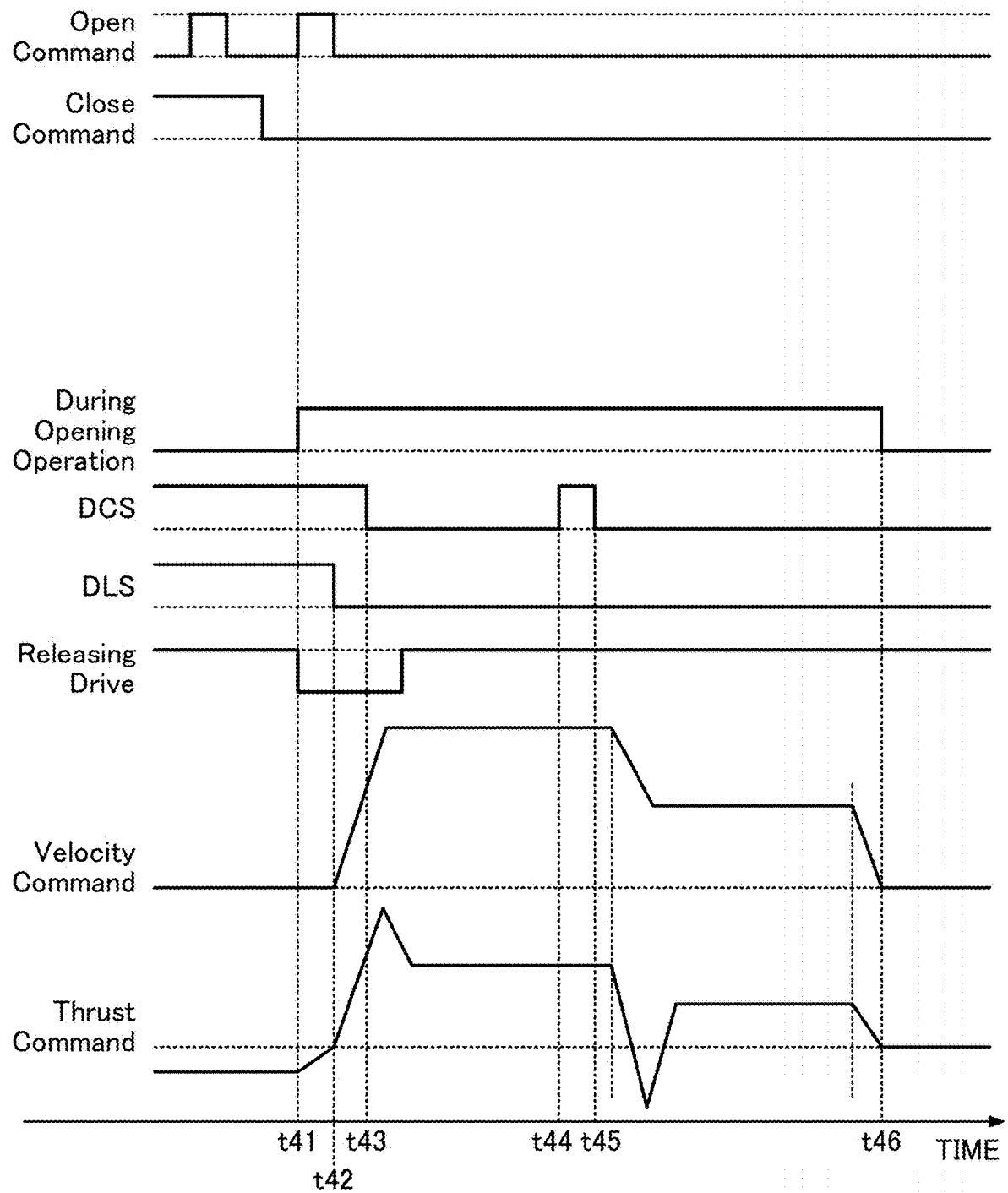
FIG. 13 is a timing chart illustrating a third example of the door opening operation when the configuration related to the door opening or closing operation is abnormal.

FIG. 13 is a timing chart illustrating a third example of the opening operation of the door 80 when the configuration related to the opening or closing operation of the door 80 is abnormal. More particularly, FIG. 13 is a diagram illustrating the timing chart of the open command, the close command, the during opening operation signal, the DCS signal, the DLS signal, the releasing drive signal, the velocity command, and the thrust command for the case where the abnormality is generated during the opening operation of the door 80, including before and after the opening operation of the door 80.

As illustrated in FIG. 13, the timing chart of FIG. 13 is the same as that of FIG. 7 except for the DCS signal, and times t41, t42, t43, and t46 correspond to the times t01, t02, t03, and t04 in FIG. 7, respectively. Hereinafter, a description will mainly be given with respect to the timing chart of the DCS signal.

The DCS signal rises from the L level (off state of the DCS 60) to the H level (on state of the DCS 60) at the position during the opening operation of the door 80 at a time t44 after the opening operation of the door 80 is started. Accordingly, the door controller 100 can determine that the abnormality is generated in either the DCS 60 or the door controller 100 itself (more particularly, the input signal detecting circuit 113). In addition, the door controller 100 may determine that the abnormality is generated in the DCS 60.

After rising to the H level, the DCS signal maintains the H-level state for a relatively short time, and falls to the L level at a time t45.

Thereafter, the door 80 reaches the fully open state, and the opening operation ends at the time t46.

In this example, similar to the first example during the opening of the door 80 described above, the door controller 100 can determine that the frequency of the abnormality detection, or the continuity of the state of the abnormality detection, is relatively low. For this reason, when the door 80 thereafter reaches the fully closed state by the closing operation of the door 80, the door controller 100 may maintain the state where the doors 80A and 80B press against each other in the fully closed state of the door 80. Hence, the door controller 100 can ensure the safety of the door 80, while continuing the operation of the door 80, according to the state of the abnormality detection.

In addition, similar to the first example during the opening of the door 80 described above, the door controller 100 may record, in the internal memory, such as the auxiliary storage device or the like, the abnormality log indicating that the abnormality related to the DCS 60 or the like, having the relatively low frequency or continuity, occurred. Hence, the person in charge of the maintenance of the railway vehicle 1 can utilize the abnormality log for maintenance of the railway vehicle 1 by checking the abnormality log ex post facto.

Further, similar to the first example during the opening of the door 80 described above, the door controller 100 may transmit the abnormality log to the vehicle controller 10, via the transmission device 160. Hence, the vehicle controller 10 can notify the abnormality having the relatively low frequency or continuity, that is, the minor abnormality, to the crew of the train including the railway vehicle 1, via the predetermined output device, for example, and urge early maintenance.

Fourth Example of Abnormality Generation State During Door Opening Operation

Figure 14:
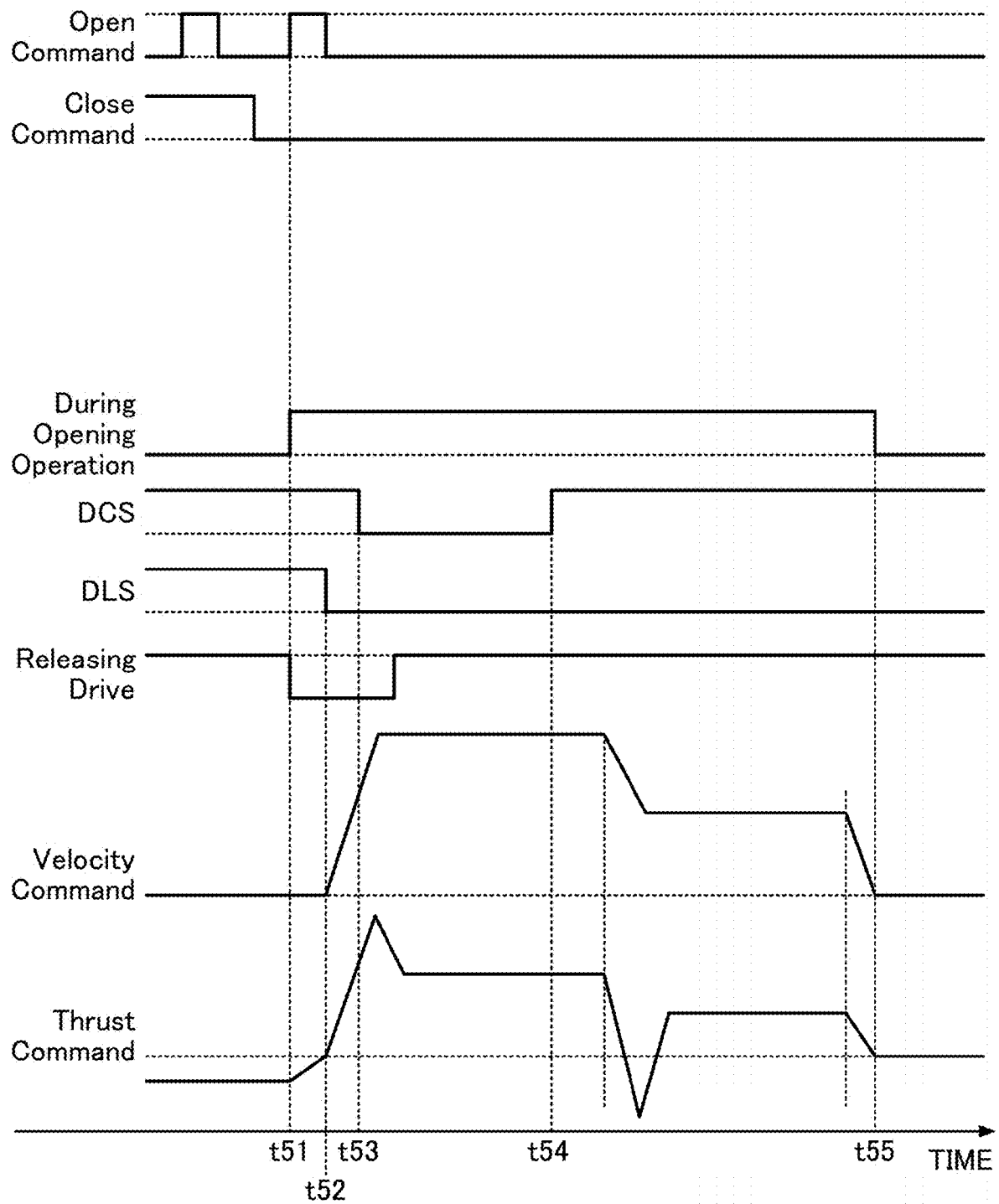
FIG. 14 is a timing chart illustrating a fourth example of the door opening operation when the configuration related to the door opening or closing operation is abnormal.

FIG. 14 is a timing chart illustrating a fourth example of the opening operation of the door 80 when the configuration related to the opening or closing operation of the door 80 is abnormal. More particularly, FIG. 14 is a diagram illustrating the timing chart of the open command, the close command, the during opening operation signal, the DCS signal, the DLS signal, the releasing drive signal, the velocity command, and the thrust command for the case where the abnormality is generated during the opening operation of the door 80, including before and after the opening operation of the door 80.

As illustrated in FIG. 14, the timing chart of FIG. 14 is the same as that of FIG. 7 except for the DCS signal, and times t51, t52, t53, and t55 correspond to the times t01, t02, t03, and t04 in FIG. 7, respectively. Hereinafter, a description will mainly be given with respect to the timing chart of the DCS signal.

The DCS signal rises from the L level (off state of the DCS 60) to the H level (on state of the DCS 60) at the open position of the door 80 after the opening operation of the door 80 is started at a time t54. Accordingly, the door controller 100 can determine that the abnormality is generated in either the DCS 60 or the door controller 100 itself (more particularly, the input signal detecting circuit 113). The door controller 100 may determine that the abnormality is generated in the DCS 60.

Thereafter, the door 80 reaches the fully open state, and the opening operation ends at the time t55.

The DCS signal maintains the H-level state after the door 80 reaches the fully closed state, that is, after the opening operation ends.

In this example, the door controller 100 can determine that the frequency of the abnormality detection, or the continuity of the state of the abnormality detection, is relatively high. For this reason, similar to the second example during the opening of the door 80 described above, the door controller 100 may switch the control entity of the opening or closing operation of the door 80 from the regular system controller 110 to the standby system controller 120 after completion of the opening operation of the door 80, or after completion of the closing operation of the door 80 performed thereafter, as soon as the door controller 100 determines that the frequency of the abnormality detection, or the continuity of the state of the abnormality detection, is relatively high. Accordingly, the door controller 100 can ensure the safety of the door 80, while continuing the operation of the door 80, according to the state of the abnormality detection.

In addition, similar to the second example during the opening of the door 80 described above, the door controller 100 may transmit, to the vehicle controller 10 via the transmission device 160, the alert indicating that the frequency of the abnormality detection, or the continuity of the state of the abnormality detection in the DCS 60 or the like, is relatively high. In this case, the vehicle controller 10 can notify the abnormality having the relatively high frequency or continuity, that is, the major abnormality, to the crew of the train including the railway vehicle 1, via the predetermined output device, for example, and strongly urge early maintenance.

First Example of Abnormality Generation State During Door Closing Operation

Figure 15:
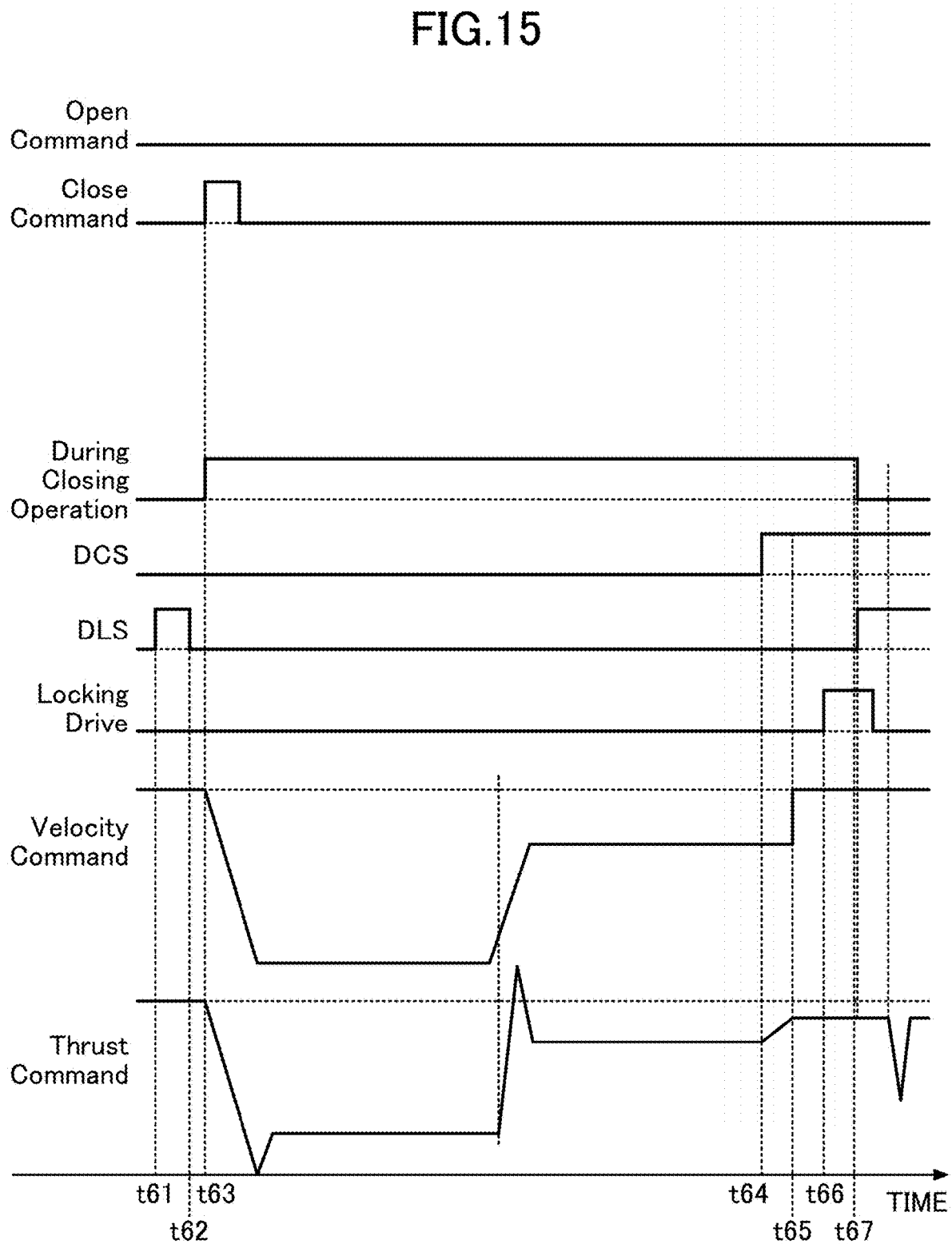
FIG. 15 is a timing chart illustrating a first example of the door closing operation when the configuration related to the door opening or closing operation is abnormal.

FIG. 15 is a timing chart illustrating a first example of the closing operation of the door 80 when the configuration related to the opening or closing operation of the door 80 is abnormal. More particularly, FIG. 14 is a diagram illustrating the timing chart of the open command, the close command, the during closing operation signal, the DCS signal, the DLS signal, the locking drive signal, the velocity command, and the thrust command for a case where the abnormality is generated during the closing operation of the door 80, including before and after the closing operation of the door 80.

As illustrated in FIG. 15, the timing chart of FIG. 15 is the same as that of FIG. 8 except for the DLS signal, and times t63, t64, t65, t66, and t67 correspond to the times t11, t12, t13, t14, and t15 in FIG. 8, respectively. Hereinafter, a description will mainly be given with respect to the timing chart of the DLS signal.

The DLS signal rises from the L level (off state of the DLS 70) to the H level (on state of the DLS 70) at the fully open position of the door 80 at the time t63 which is a timing before the door controller 100 receives the close command for the door 80. Accordingly, the door controller 100 can determine that the abnormality is generated in one of the locking device 50, the DLS 70, and the door controller 100 itself (more particularly, the input signal detecting circuit 113). In addition, the door controller 100 may determine that the abnormality is generated in either the locking device 50 or the DLS 70.

After rising to the H level, the DLS signal maintains the H-level state for a relatively short time, and falls to the L level at a time t62 before the door controller 100 receives the close command for the door 80.

In this example, the door controller 100 can determine that the frequency of the abnormality detection, or the continuity of the state of the abnormality detection, is relatively low. For this reason, when the door 80 reaches the fully closed state at the time t64 by the closing operation of the door 80, the door controller 100 may maintain the state where the doors 80A and 80B press against each other in the fully closed state of the door 80. Hence, the door controller 100 can ensure the safety of the door 80, while continuing the operation of the door 80, according to the state of the abnormality detection.

In addition, the door controller 100 may record, in the internal memory, such as the auxiliary storage device or the like, the abnormality log indicating that the abnormality related to the locking device 50, the DLS 70, or the like, having the relatively low frequency or continuity, occurred. Hence, the person in charge of the maintenance of the railway vehicle 1 can utilize the abnormality log for maintenance of the railway vehicle 1 by checking the abnormality log ex post facto.

Further, the door controller 100 may transmit the abnormality log to the vehicle controller 10, via the transmission device 160. Hence, the vehicle controller 10 can notify the abnormality having the relatively low frequency or continuity, that is, the minor abnormality, to the crew of the train including the railway vehicle 1, via the predetermined output device, for example, and urge early maintenance.

Second Example of Abnormality Generation State During Door Closing Operation

Figure 16:
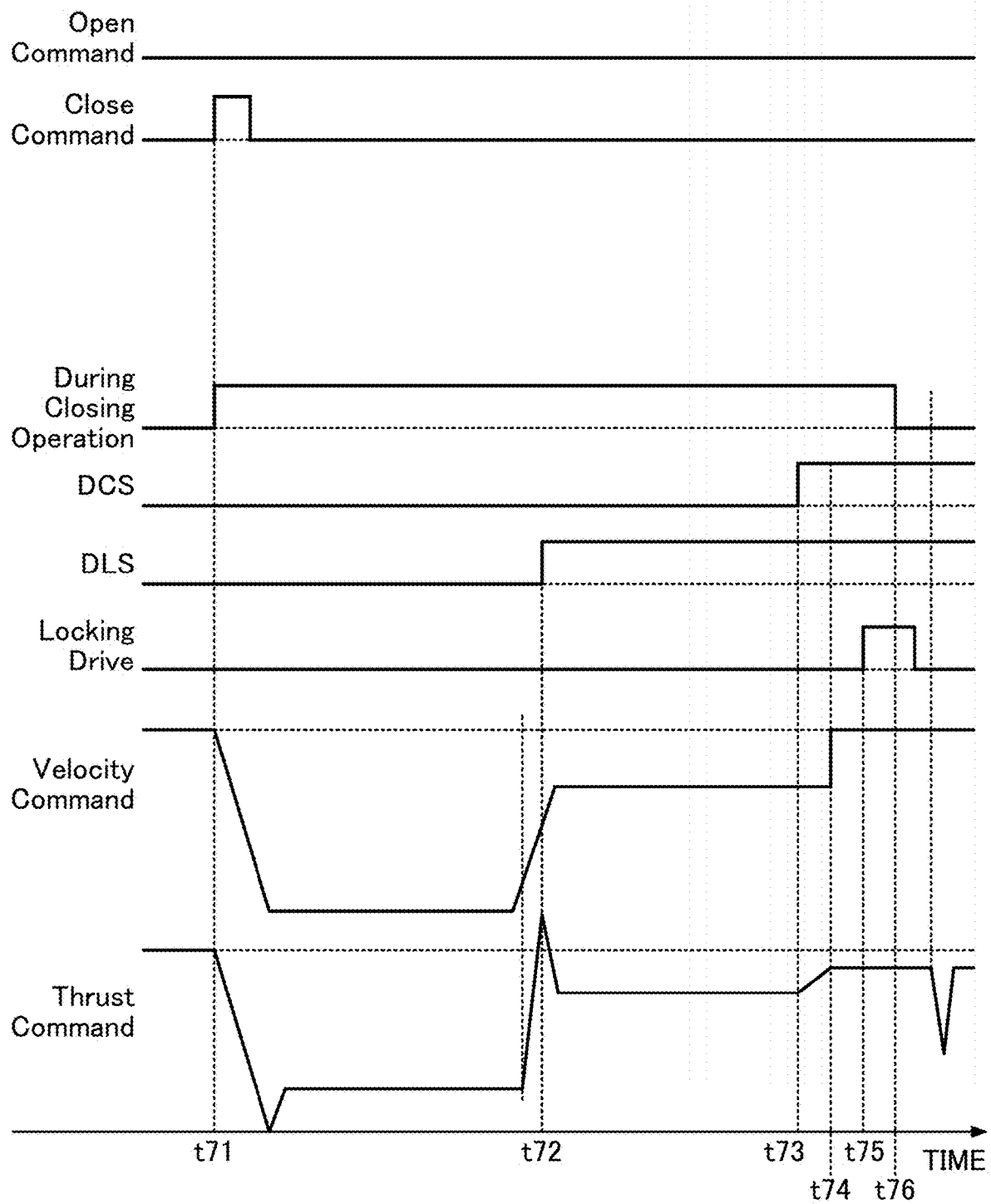
FIG. 16 is a timing chart illustrating a second example of the door closing operation when the configuration related to the door opening or closing operation is abnormal.

FIG. 16 is a timing chart illustrating a second example of the closing operation of the door 80 when the configuration related to the opening or closing operation of the door 80 is abnormal. More particularly, FIG. 16 is a diagram illustrating the timing chart of the open command, the close command, the during closing operation signal, the DCS signal, the DLS signal, the locking drive signal, the velocity command, and the thrust command for the case where the abnormality is generated during the closing operation of the door 80, including before and after the closing operation of the door 80.

As illustrated in FIG. 16, the timing chart of FIG. 16 is the same as that of FIG. 8 except for the DLS signal, and times t71, t73, t74, t75, and t76 correspond to the times t11, t12, t13, t14, and t15 in FIG. 8, respectively. Hereinafter, a description will mainly be given with respect to the timing chart of the DLS signal.

The DLS signal rises from the L level (off state of the DLS 70) to the H level (on state of the DLS 70) at the position during the closing operation of the door 80 at a time t72 after the closing operation of the door 80 is started. Accordingly, the door controller 100 can determine that the abnormality is generated in one of the locking device 50, the DLS 70, and the door controller 100 itself (more particularly, the input signal detecting circuit 113). In addition, the door controller 100 may determine that the abnormality is generated in either the locking device 50 or the DLS 70.

When the door 80 reaches the fully closed state, the DCS signal rises from the L level to the H level at the time t73.

When the DCS signal rises to the H level at the time t73, and makes the velocity command zero at the time t74, the door controller 100 raises the release drive signal from the L level to the H level at the time t75. Hence, the locking device 50 is driven and locked, thereby locking the door 80.

The DLS signal maintains the H-level state at the time t74, without falling to the L level, until the timing when the door 80 is locked.

In this example, the door controller 100 can determine that the frequency of the abnormality detection, or the continuity of the state of the abnormality detection, is relatively high. For this reason, the door controller 100 may switch the control entity of the opening or closing operation of the door 80 from the regular system controller 110 to the standby system controller 120 as soon as the door controller 100 determines that the frequency of the abnormality detection, or the continuity of the state of the abnormality detection, is relatively high, or after completion of the closing operation of the door 80. Accordingly, the door controller 100 can ensure the safety of the door 80, while continuing the operation of the door 80, according to the state of the abnormality detection.

In addition, the door controller 100 may transmit, to the vehicle controller 10 via the transmission device 160, the alert indicating that the frequency of the abnormality detection, or the continuity of the state of the abnormality detection in the locking device 50, the DLS 70, or the like, is relatively high. In this case, the vehicle controller 10 can notify the abnormality having the relatively high frequency or continuity, that is, the major abnormality, to the crew of the train including the railway vehicle 1, via the predetermined output device, for example, and strongly urge early maintenance.

Third Example of Abnormality Generation State
During Door Closing Operation

Figure 17:
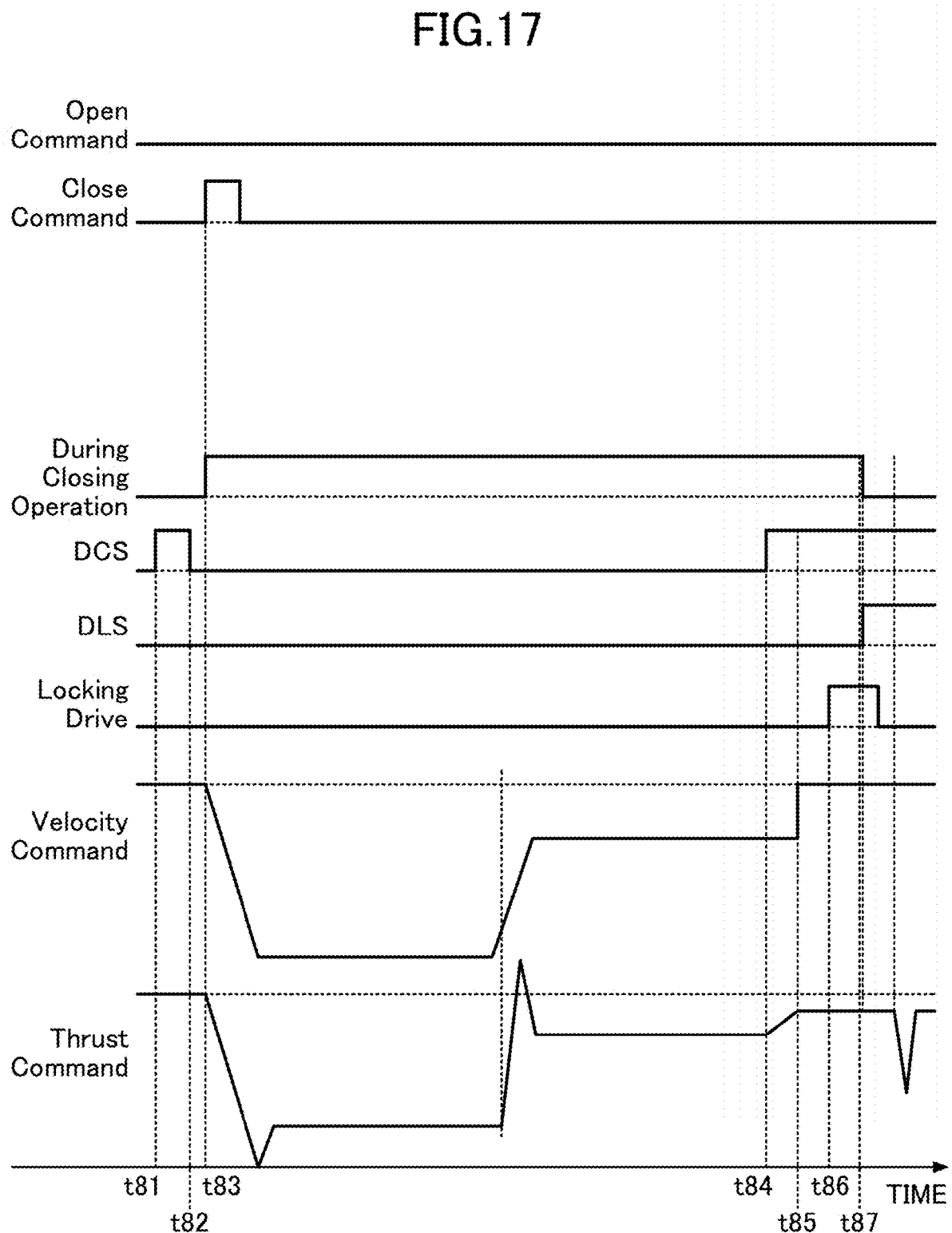
FIG. 17 is a timing chart illustrating a third example of the door closing operation when the configuration related to the door opening or closing operation is abnormal.

FIG. 17 is a timing chart illustrating a third example of the closing operation of the door 80 when the configuration related to the opening or closing operation of the door 80 is abnormal. More particularly, FIG. 17 is a diagram illustrating the timing chart of the open command, the close command, the during closing operation signal, the DCS signal, the DLS signal, the locking drive signal, the velocity command, and the thrust command for the case where the abnormality is generated during the closing operation of the door 80, including before and after the closing operation of the door 80.

As illustrated in FIG. 17, the timing chart of FIG. 17 is the same as that of FIG. 8 except for the DCS signal, and times t83, t84, t85, t86, and t87 correspond to the times t11, t12, t13, t14, and t15 in FIG. 8, respectively. Hereinafter, a description will mainly be given with respect to the timing chart of the DCS signal.

The DCS signal rises from the L level (off state of the DCS 60) to the H level (on state of the DCS 60) in the fully open state of the door 80 before the time t83 which is a timing when the door controller 100 receives the close command for the door 80. Accordingly, the door controller 100 can determine that the abnormality is generated in either the DCS 60 or the door controller 100 itself (more particularly, the input signal detecting circuit 113). In addition, the door controller 100 may determine that the abnormality is generated in the DCS 60.

After rising to the H level, the DCS signal maintains the H-level state for a relatively short time, and falls to the L level at a time t82 before the door controller 100 receives the close command for the door 80.

In this example, the door controller 100 can determine that the frequency of the abnormality detection, or the continuity of the state of the abnormality detection, is relatively low. For this reason, when the door 80 thereafter reaches the fully closed state at the time t84 by the closing operation of the door 80, the door controller 100 may maintain the state where the doors 80A and 80B press against each other in the fully closed state of the door 80. Hence, the door controller 100 can ensure the safety of the door 80, while continuing the operation of the door 80, according to the state of the abnormality detection.

In addition, the door controller 100 may record, in the internal memory, such as the auxiliary storage device or the like, the abnormality log indicating that the abnormality related to the DCS 60 or the like, having the relatively low frequency or continuity, occurred. Hence, the person in charge of the maintenance of the railway vehicle 1 can utilize the abnormality log for maintenance of the railway vehicle 1 by checking the abnormality log ex post facto.

Further, the door controller 100 may transmit the abnormality log to the vehicle controller 10, via the transmission device 160. Hence, the vehicle controller 10 can notify the abnormality having the relatively low frequency or continuity, that is, the minor abnormality, to the crew of the train including the railway vehicle 1, via the predetermined output device, for example, and urge early maintenance.

Fourth Example of Abnormality Generation State
During Door Closing Operation

Figure 18:
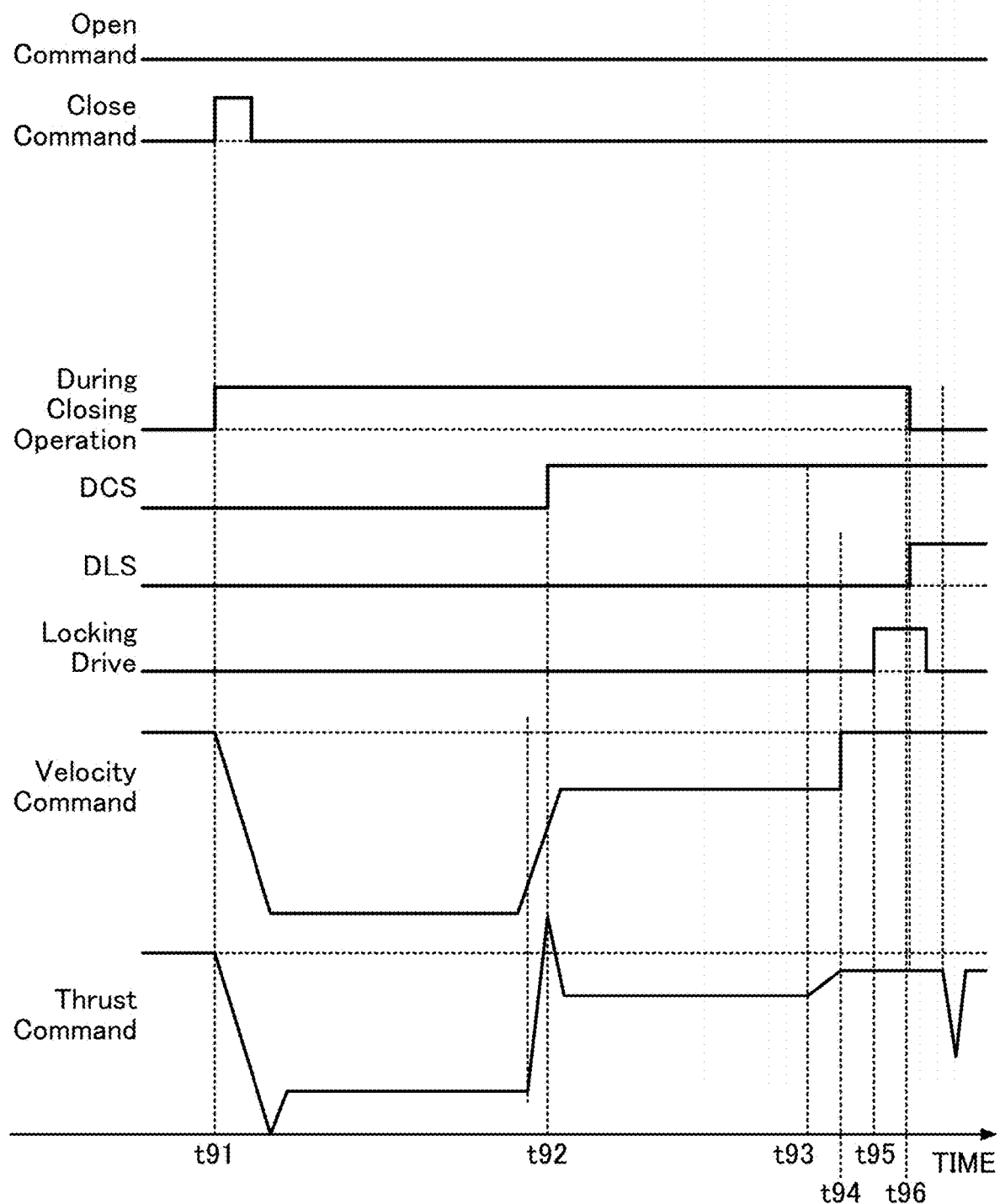
FIG. 18 is a timing chart illustrating a fourth example of the door closing operation when the configuration related to the door opening or closing operation is abnormal.

FIG. 18 is a timing chart illustrating a fourth example of the closing operation of the door 80 when the configuration related to the opening or closing operation of the door 80 is abnormal. More particularly, FIG. 18 is a diagram illustrating the timing chart of the open command, the close command, the during closing operation signal, the DCS signal, the DLS signal, the locking drive signal, the velocity command, and the thrust command for the case where the abnormality is generated during the closing operation of the door 80, including before and after the closing operation of the door 80.

As illustrated in FIG. 18, the timing chart of FIG. 18 is the same as that of FIG. 8 except for the DCS signal, and times t91, t93, t94, t95, and t96 correspond to the times t11, t12, t13, t14, and t15 in FIG. 8, respectively. Hereinafter, a description will mainly be given with respect to the timing chart of the DCS signal.

The DCS signal rises from the L level (off state of the DCS 60) to the H level (on state of the DCS 60) at the closed position of the door 80 after the closing operation of the door 80 is started at a time t92. Accordingly, the door controller 100 can determine that the abnormality is generated in one of the locking device 50, the DCS 60, and the door controller 100 itself (more particularly, the input signal detecting circuit 113). The door controller 100 may determine that the abnormality is generated in the locking device 50 or the DCS 60.

The DCS signal maintains the H-level state at the time 93, without falling to the L level, until the timing when the door 80 reaches the fully closed state.

In this example, the door controller 100 can determine that the frequency of the abnormality detection, or the continuity of the state of the abnormality detection, is relatively high. For this reason, the door controller 100 may switch the control entity of the opening or closing operation of the door 80 from the regular system controller 110 to the standby system controller 120 as soon as the door controller 100 determines that the frequency of the abnormality detection, or the continuity of the state of the abnormality detection, is relatively high, or after completion of the closing operation of the door 80. Accordingly, the door controller 100 can ensure the safety of the door 80, while continuing the operation of the door 80, according to the state of the abnormality detection.

In addition, the door controller 100 may transmit, to the vehicle controller 10 via the transmission device 160, the alert indicating that the frequency of the abnormality detection, or the continuity of the state of the abnormality detection in the DCS 60 or the like, is relatively high. In this case, the vehicle controller 10 can notify the abnormality having the relatively high frequency or continuity, that is, the major abnormality, to the crew of the train including the railway vehicle 1, via the predetermined output device, for example, and strongly urge early maintenance.

Another Example of Configuration Related to Door Opening or Closing Operation Next, another example of the configuration related to the opening or closing operation of the door 80 of the railway vehicle 1 will be described, by referring to FIG. 19.

Figure 19:
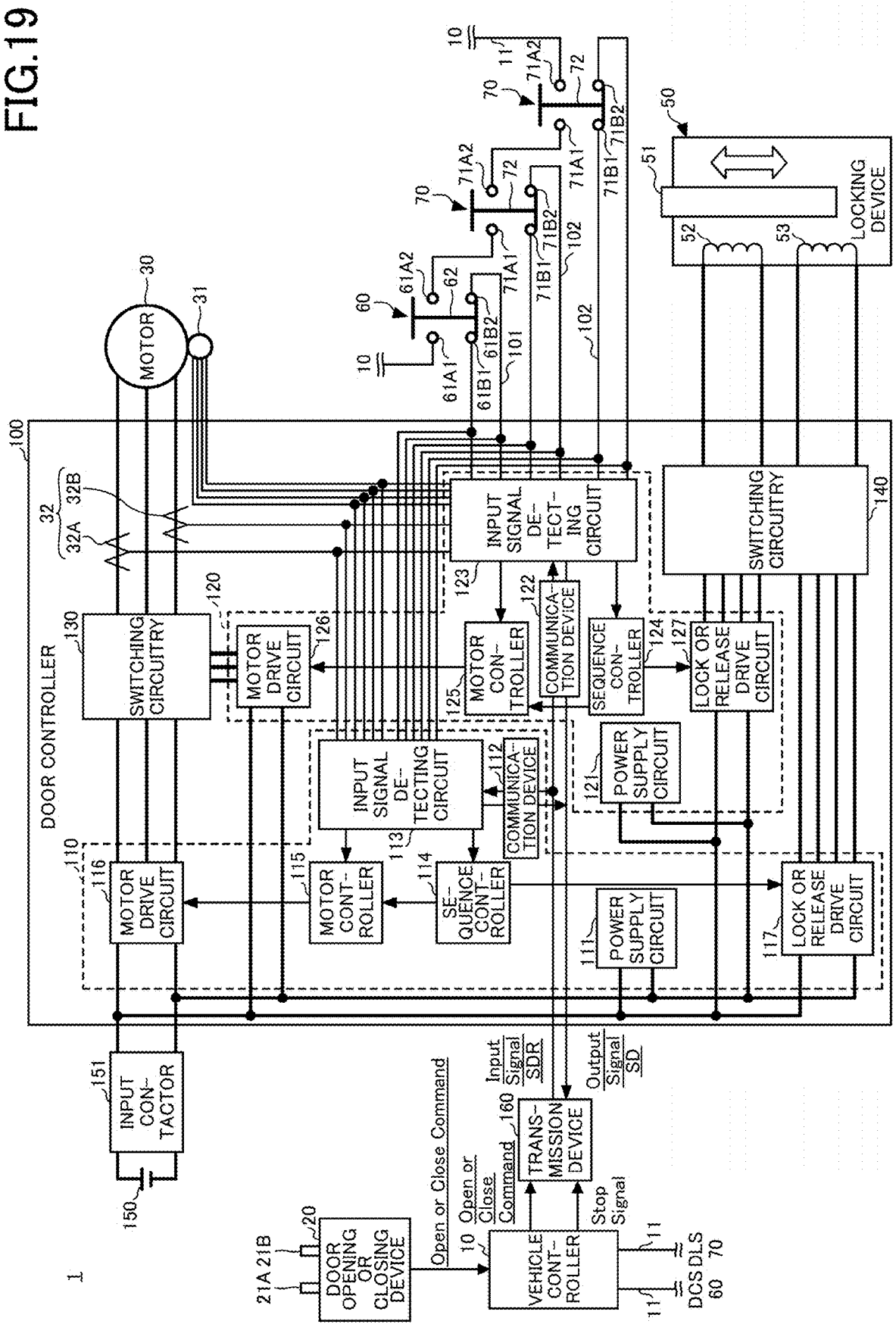
FIG. 19 is a block diagram illustrating another example of the configuration related to the door opening or closing operation of the railway vehicle.

FIG. 19 is a block diagram illustrating another example of the configuration related to the opening or closing operation of the door 80 of the railway vehicle 1.

In this example, the configurations of the door 80 and the door drive mechanism 200 are the same as those of the example described above in conjunction with FIG. 2 through FIG. 6, and thus, the configurations in this example will be described with the aid of FIG. 2 through FIG. 6. Further, in this example, a description will mainly be given with respect to constituent elements different from those of the example described above in conjunction with FIG. 1, and the description of the same or corresponding constituent elements may be simplified or omitted.

The configuration related to the opening or closing operation of the door 80 according to this other example differs from the that of the example described above in that two DLSs 70 are provided to form a redundant configuration.

The DCS 60 and the two DLSs 70 have the A-contacts thereof respectively inserted in series with respect to the wiring 11. Thus, when the DCS 60 and the two DLSs 70 are all in the on state, the interlock signal assumes the H level, and the vehicle controller 10 can cause the railway vehicle 1 to run.

In addition, the two DLSs 70 have the B-contacts (fixed contacts 71B1 and 71B2) thereof connected to the door controller 100 (input signal detecting circuits 113 and 123) via the wiring 102, similar to the example described above in conjunction with FIG. 1. Hence, the door controller 100 can independently recognize the on or off state of the two DLSs 70.

Further, three or more DLSs 70 may be provided. A plurality of DCSs 60 may be provided in place or in addition to the DLS 70.

Another Example of Coping Strategy for Abnormality Generated in Configuration Related to Door Opening or Closing Operation Next, another example of the coping strategy for the abnormality generated in the configuration related to the opening or closing operation of the door 80 will be described, by referring to FIGS. 20 and 21. More particularly, a specific example of the coping strategy for the abnormality generated in the configuration related to the opening or closing operation of the door 80, on a precondition that a configuration illustrated in FIG. 19 is employed.

FIG. 20 and FIG. 21 are diagrams illustrating another example of the coping strategy for the abnormality generated in the configuration related to the opening or closing operation of the door 80. More particularly, FIG. 20 and FIG. 21 illustrate another example of the coping strategy for the abnormality generated in the configuration related to the opening or closing operation of the door 80, when opening the door 80 (during opening of the door 80), and when closing the door 80 (during closing of the door 80), respectively.

Five states of the door 80, namely, "fully closed & locked", "fully closed & released", "start opening operation", "during opening operation", and "fully open" illustrated in FIG. 20, correspond to the states of the door 80 illustrated in FIG. 2, FIG. 3, FIG. 4, FIG. 5, and FIG. 6 for the example described above in conjunction with FIG. 9, respectively. Similarly, the five states of the door 80, namely, "fully open", "start closing operation", "during closing operation", "fully closed & released", and "fully closed & locked" illustrated in FIG. 21, correspond to the states of the door 80 illustrated in FIG. 6, FIG. 5, FIG. 4, FIG. 3, and FIG. 2 for the example described above in conjunction with FIG. 10, respectively.

In this example, the method for determining the abnormality utilizing the signal from the DLS 70 is different from that of the examples described above in conjunction with FIG. 9 and FIG. 10, while the method for determining the abnormality utilizing the signal from the DCS 60 is the same as that of the examples described above in conjunction with FIG. 9 and FIG. 10. For this reason, a description of the method for determining the abnormality utilizing the signal from the DCS 60 will be omitted.

As illustrated in FIG. 20, during opening of the door 80, the input signal detecting circuit 113 determines the presence or absence of the abnormality in the configuration related to the opening or closing operation of the door 80, when the door 80 is in the fully closed and locked state. More particularly, when opening the door 80, the input signal detecting circuit 113 determines the presence or absence of the abnormality in the locking device 50, the DLS 70, or the like, based on the signal from the DLS 70, when the signals from the encoder 31 indicate the fully closed state of the door 80 and the locking device 50 is locked by the lock or release drive circuit 117.

During the opening of the door 80, in the case where the signals from the encoder 31 indicate the fully closed state of the door 80, and the locking device 50 is in the locked state, the input signal detecting circuit 113 determines that the abnormality is generated in some of the plurality of DLSs 70, which are targets, when the signals from some of the plurality of DLSs 70 are in the off state (A-contact is off, and B-contact is on). This is because it is very unlikely for only some of the plurality of DLSs 70 to output erroneous signals due to the abnormality generated in the locking device 50, or to erroneously accept the signals from only some of the DLSs 70 due to the abnormality generated in the door controller 100.

On the other hand, during the opening of the door 80, in a case where the signals from the encoder 31 indicate the fully closed state, and the locking device 50 is in the locked state, the input signal detecting circuit 113 determines that the abnormality is generated in the locking device 50 when all of the signals from the plurality of DLSs 70 are in the off state (A-contact off, and B-contact on). In this case, the input signal detecting circuit 113 may determine that the abnormality is generated in either the locking device 50 or the door controller 100. This is because it is very unlikely for the abnormalities to be generated simultaneously in the plurality of DLSs 70.

In addition, during the opening of the door 80, the input signal detecting circuit 113 determines the presence or absence of the abnormality in the configuration related to the opening or closing operation of the door 80, when the door 80 is in a state other than the fully closed state. More particularly, when opening the door 80, the input signal detecting circuit 113 determines the presence or absence of the abnormality in the locking device 50 and the DLS 70, based on the signal from the DLS 70, when the signals from the encoder 31 indicate the position other than the position in the fully closed state of the door 80.

During the opening of the door 80, the input signal detecting circuit 113 determines that the abnormality is generated in some of the plurality of DLSs 70, which are targets, when the signals of the encoder 31 indicates the state other than the fully closed state of the door 80, and the signals from some of the plurality of DLSs 70 is in the on state (A-contact on, and B-contact off).

On the other hand, during the opening of the door 80, the input signal detecting circuit 113 determines that the abnormality is generated in the locking device 50, when the signals from the encoder 31 indicate the position other than the position in the fully closed state of the door 80, and all of the signals from the plurality of DLSs 70 are in the on state (A-contact on and B-contact off). In this case, the input signal detecting circuit 113 may determine that the abnormality is generated in either the locking device 50 or the door controller 100.

Similarly, as illustrated in FIG. 21, during the closing of the door 80, the input signal detecting circuit 113 determines the presence or absence of the abnormality in the configuration related to the opening or closing operation of the door 80, in the state other than the fully closed state of the door 80. More particularly, when closing the door 80, the input signal detecting circuit 113 determines the presence or absence of the abnormality in the locking device 50, the DLS 70, or the like, based on the signal from the DLS 70, when the signals from the encoder 31 indicate the position other than the position in the fully closed state of the door 80.

During the closing of the door 80, the input signal detecting circuit 113 determines that the abnormality is generated in some of the plurality of DLSs 70, which are targets, when the signals from the encoder 31 indicate the state other than the fully closed state of the door 80, and the signals from some of the plurality of DLSs 70 is in the on state (A-contact is on, and B-contact is off).

On the other hand, during the closing of the door 80, the input signal detecting circuit 113 determines that the abnormality is generated in the locking device 50, when the signals from the encoder 31 indicate the position other than the position in the fully closed state of the door 80, and all of the signals from the plurality of DLSs 70 are in the on state (A-contact is on, and B-contact is off). In this case, the input signal detecting circuit 113 may determine that the abnormality is generated in either the locking device 50 or the door controller 100.

Further, during the closing of the door 80, the input signal detecting circuit 113 determines the presence or absence of the abnormality in the configuration related to the opening or closing operation of the door 80, when the door 80 is in the fully closed and locked state. More particularly, when closing the door 80, the input signal detecting circuit 113 determines the presence or absence of the abnormality in the locking device 50 and the DLS 70, based on the signal from the DLS 70, when the signals from the encoder 31 indicate the fully closed state of the door 80 and the locking device 50 is locked by the lock or release drive circuit 117.

During the closing of the door 80, the input signal detecting circuit 113 determines that the abnormality is generated in some of the plurality of DLSs 70, which are targets, when the signals from the encoder 31 indicate the fully closed state of the door 80, the locking device 50 is in the locked state, and the signals from some of the plurality of DLSs 70 are in the off state (A-contact off, and B-contact on).

On the other hand, during the closing of the door 80, the input signal detecting circuit 113 determines that the abnormality is generated in the locking device 50, when the signals from the encoder 31 indicate the fully closed state of the door 80, the locking device 50 is in the locked state, and all of the signals from the plurality of DLSs 70 are in the off state (A-contact is off, and B-contact is on). In this case, the input signal detecting circuit 113 may determine that the abnormality is generated in either the locking device 50 or the door controller 100.

When a plurality of DCSs 60 are provided as described above, the input signal detecting circuit 113 may determine the presence or absence of the abnormality while distinguishing the abnormality in the DCSs 60 from the abnormality in the door controller 100, in a manner similar to using the signals from the plurality of DLSs 70.

Hence, in this example, the door controller 100 can determine the abnormality in the configuration related to the opening or closing operation of the door 80, while distinguishing the target of the abnormality detection, based on the signals from the plurality of DLSs 70, the signals from the plurality of DCSs 60, and the signals from the encoder 31.

Functions

Next, functions of the door controller 100 according to this embodiment will be described.

For example, the abnormality in the configuration abnormality related to the opening or closing operation of the door 80 may be determined, using only the outputs of the DCS 60 and the DLS 70.

However, according to such a method, the presence or absence of the abnormality in the configuration related to the opening or closing operation of the door 80 can only be determined in a state where the position of the door 80 is known in advance, such as the position upon completion of the opening operation, the position upon completion of the closing operation, or the like of the door 80. For this reason, the following problems may occur.

For example, even if the output of the DCS 60 or the DLS 70 indicates the open state other than the fully closed state of the door 80, or the unlocked state of the door 80, upon completion of the door closing operation, it may not be possible to determine whether the abnormality is the stuck or locked DCS 60 or DLS 70, or the deteriorated DCS 60 or DLS 70. Similarly, for example, even if the output of the DCS 60 or the DLS 70 indicates the closed state of the door 80 or the locked state of the door 80, upon completion of the opening operation of the door 80, it may not be possible to determine whether the abnormality is the stuck or locked DCS 60 or DLS 70, or the deteriorated DCS 60 or DLS 70. Further, in the above described method, it is not possible to know whether the DCS 60 or the DLS 70 itself is the cause of an inappropriate state indicated by the output of the DCS 60 or the DLS 70, or whether the locking device 50 or the signal receiving side (door controller 100) is the cause of the inappropriate state, and for this reason, there is a possibility that it will be impossible to determine the target having the abnormality.

In contrast, in this embodiment, the door controller 100 acquires the output signals of the DCS 60 and the DLS 70, and the position information (output signals of the encoder 31) in the opening or closing direction of the door 80. Further, the door controller 100 determines the abnormality in the configuration related to the opening or closing operation of the door 80, based on the acquired output signals of the DCS 60 and the DLS 70, and the acquired position information in the opening or closing direction of the door 80.

Accordingly, the door controller 100 can recognize the position information in the opening or closing direction of the door 80. For this reason, the door controller 100 can determine whether or not the output signal of the DCS 60 or the DLS 70 is appropriate with respect to the position information in the opening or closing direction of the door 80, even at the opening or closing position of the door 80 other than a starting position or an ending position of the opening or closing operation of the door 80, and can determine the abnormality in the configuration related to the opening or closing operation of the door 80. As a result, the door controller 100 can determine the contents of the abnormality, the configuration having the abnormality, or the like, by determining the abnormality multiple times during the opening or closing operation of the door 80, analyzing the results of determining the abnormality multiple times, or the like, for example. Accordingly, the door controller 100 can more appropriately determine the abnormality in the configuration related to the opening or closing operation of the door 80 of the railway vehicle 1.

Further, in this embodiment, the door controller 100 may determine the abnormality in the configuration related to the opening or closing operation of the door 80, during the closing operation of the door 80 or during the opening operation of the door 80.

Hence, the door controller 100 can increase the opportunities of determining the abnormality in the configuration related to the opening or closing operation of the door 80, and in particular, more appropriately determine the abnormality in the configuration related to the opening or closing operation of the door 80 of the railway vehicle 1.

In addition, in this embodiment, the door controller 100 determines the presence or absence of the abnormality in the configuration related to the opening or closing operation of the door 80, multiple times, based on the position information in the opening or closing direction of the door 80, and the output signal of the DCS 60 or the DLS 70. In addition, the door controller 100 may determine the content of the abnormality or the configuration having the abnormality, based on the results of performing the determining multiple times.

Accordingly, the door controller 100 can more appropriately determine the abnormality in the configuration related to the opening or closing operation of the door 80 of the railway vehicle 1, utilizing the increased opportunities of determining the abnormality in the configuration related to the opening or closing operation of the door 80.

Moreover, in this embodiment, the door controller 100 may determine the presence or absence of the abnormality in the configuration related to the opening or closing operation of the door 80, based on the presence or absence of the matching between the position information in the opening or closing direction of the door 80, and the output signal of the DCS 60 or the DLS 70.

The door controller 100 can thus determine the presence or absence of the abnormality in the configuration related to the opening or closing operation of the door 80.

Furthermore, in this embodiment, the door controller 100 may determine that the abnormality is generated in the door controller 100 (the input signal detecting circuit 113 or the input signal detecting circuit 123) which receives the output signal of the locking device 50, the DLS 70, or the DLS 70, in a case where the position information in the opening or closing direction of the door 80 indicates a state different from the locked state of the door 80, and the output signal of the DLS 70 indicates the locked state of the door 80.

Accordingly, the door controller 100 can determine the presence or absence of the abnormality in the configuration related to the opening or closing operation of the door 80.

In this embodiment, the door controller 100 may determine the abnormality generated in the DCS 60 or the door controller 100 which receives the output signal of the DCS 60, in a case where the position information in the opening or closing direction of the door 80 indicates a state different from the fully closed state of the door 80, and the output signal of the DCS 60 indicates the fully closed state of the door 80.

Accordingly, the door controller 100 can determine the presence or absence of the abnormality in the configuration related to the opening or closing operation of the door 80.

In this embodiment, the door controller 100 may determine the abnormality generated in the configuration related to the opening or closing operation of the door 80, based on the output signals of the plurality of DCSs 60 or the plurality of DLSs 70, and the position information in the opening or closing direction of the door 80.

Hence, the door controller 100 can identify the configuration having the abnormality from among the configurations related to the opening or closing operation of the door 80.

In this embodiment, the door controller 100 may determine that the abnormality is generated in some of the plurality of DLSs 70, which are targets, in a case where the position information in the opening or closing direction of the door 80 indicates a state different from the locked state of the door 80, and the output signals of some of the plurality of DLSs 70 indicate the locked state of the door 80.

Accordingly, the door controller 100 can identify the configuration having the abnormality from among the configurations related to the opening or closing operation of the door 80.

In this embodiment, the door controller 100 may determine that the abnormality is generated in the locking device 50 of the door 80 or the door controller 100 which receives the output signals of the plurality of DLSs 70, in a case where the position information in the opening or closing direction of the door indicates a state different from the locked state of the door 80, and all of the output signals of the plurality of DLSs 70 indicate the locked state of the door 80.

The door controller 100 can thus identify the configuration having the abnormality from among the configurations related to the opening or closing operation of the door 80.

Further, in this embodiment, the door controller 100 may determine that the abnormality is generated in some of the plurality of DCSs 60, which are targets, in a case where the position information in the opening or closing direction of the door 80 indicates a state different from the fully closed state of the door 80, and the output signals of some of the plurality of DCSs 60 of the plurality of DCS 60 indicate the fully closed state of the door 80.

Accordingly, the door controller 100 can identify the configuration having the abnormality from among the configurations related to the opening or closing operation of the door 80.

Moreover, in this embodiment, the door controller 100 may determine that the abnormality is generated in the door controller 100 which receives the output signals of the plurality of DCSs 60, in a case where the position information in the opening or closing direction of the door 80 indicates a state different from the fully closed state of the door 80, and all of the output signals of the plurality of DCSs 60 indicate the fully closed state of the door 80.

The door controller 100 can thus identify the configuration having the abnormality from among the configurations related to the opening or closing operation of the door 80.

Variations and Modifications

While the embodiments have been described in detail above, the present disclosure is not limited to the specific embodiments, and various variations and modifications may be made within the scope of the present invention recited in the claims, for example.

For example, in the embodiments described above, the functions of the "monitoring apparatus" are described as being provided in the input signal detecting circuits 113 and 123 of the regular system controller 110 and the standby system controller 120, respectively, but the configuration or arrangement is not limited to such. In addition, the functions of the "monitoring apparatus" may be provided in the regular system controller 110 and the standby system controller 120, as functional units independent of the input signal detecting circuits 113 and 123, for example. The functions of the "monitoring apparatus" may be provided in one of the door controllers 100, to determine the abnormality in both the regular system controller 110 and the standby system controller 120. Moreover, the functions of the "monitoring apparatus" may be provided externally to the door controller 100.

Further, in the embodiments described above, the position (fully closed position) indicating the fully closed state of the door 80, and a position (locked position) indicating the locked state of the door 80 are described as being the same, but the configuration or arrangement is not limited to such. In other words, the fully closed position of the door 80 may be more open than the locked position.

For example, FIG. 22 and FIG. 23 are diagrams for explaining a further example of the method for determining the abnormality in the configuration related to the opening or closing operation of the door 80. More particularly, FIG. 22 and FIG. 23 correspond to FIG. 9 and FIG. 10 described above, respectively, and the "fully closed & locked position" indicated by the signals from the encoder 31 is replaced by the "locked position".

Moreover, for example, FIG. 24 and FIG. 25 are diagrams for explaining a further example of the method for determining the abnormality in the configuration related to the opening or closing operation of the door 80. More particularly, FIG. 24 and FIG. 25 correspond to FIG. 20 and FIG. 21 described above, respectively, and the "fully closed & locked position" indicated by the signals from the encoder 31 is replaced by the "locked position".

In this case, the monitoring apparatus may determine that the abnormality is generated in one of the locking device 50, the DLS 70, and the door controller 100 (refer to FIG. 22 and FIG. 23), in a case where the signals from the encoder 31 indicate the full closed position of the door 80, and the signal from the DLS 70 is in the on state (A-contact is on, and B-contact is off). Similarly, the monitoring apparatus may determine that the abnormality is generated in some of the plurality of DLSs 70, which are targets (refer to FIG. 24 and FIG. 25), in a case where the signals from the encoder 31 indicate the fully closed position of the door 80, and the signals from some of the plurality of DLSs 70 are in the on state (A-contact is on, and B-contact is off). On the other hand, the monitoring apparatus may determine that the abnormality is generated in the locking device 50, in a case where the signals from the encoder 31 indicate the fully closed position of the door 80, and all of the signals from the plurality of DLSs 70 are in the on state (A-contact is on, and B-contact is off). Hence, it is possible to determine the abnormality in the configuration related to the opening or closing operation of the door 80, even in the fully closed state of the door 80.

According to each of the embodiments described above, it is possible to provide a technique capable of more appropriately determining the abnormality in the configuration related to the door opening or closing operation of the railway vehicle.

The description above use terms such as "determine", "identify", or the like to describe the embodiments, however, such tams are abstractions of the actual operations that are performed. Hence, the actual operations that correspond to such terms may vary depending on the implementation, as is obvious to those skilled in the art.

All examples and conditional language recited herein are intended for pedagogical purposes to aid the reader in understanding the invention and the concepts contributed by the inventor to furthering the art, and are to be construed as being without limitation to such. More particularly, recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitoring apparatus comprising:
a sensing circuitry including
a first switch configured to sense a locked or released state of a door of a railway vehicle and output a first signal indicating the locked or released state of the door,
a second switch configured to sense an open or closed state of the door and output a second signal indicating the open or closed state of the door, and
an encoder configured to sense a position in an opening or closing direction of the door and output a third signal indicating the position;
a storage device configured to store a program; and
a processor configured to execute the program and perform a process including
acquiring an output of the sensing circuitry, including the first, second, and third signals,
determining an abnormality in a configuration related to an opening or closing operation of the door when the locked or released state of the door indicated by the first signal does not match a locked or released state of the door anticipated at the position of the door indicated by the third signal, or when the open or closed state of the door indicated by the second signal does not match an open or closed state of the door anticipated at the position of the door indicated by the third signal, and
employing different coping strategies to determine a presence or absence of the abnormality in the configuration related to the opening or closing operation of the door.

2. The monitoring apparatus as claimed in claim 1, wherein the determining determines the abnormality during the closing operation or the opening operation of the door.

3. The monitoring apparatus as claimed in claim 1, wherein the processor is configured to execute the program and perform the process further including
performing, multiple times, the determining the abnormality in the configuration related to the opening or closing operation of the door, and
determining contents of the abnormality, or the configuration including the abnormality, based on results of the performing the determining the multiple times.

4. The monitoring apparatus as claimed in claim 1, wherein the processor is configured to execute the program and perform the process further including
determining the abnormality in the sensing circuitry, a locking device of the door, or a signal detecting circuit which captures the output of the sensing circuitry, when the position indicated by the third signal indicates a state different from a locked state of the door, while the output of the sensing circuitry indicates the locked state of the door.

5. The monitoring apparatus as claimed in claim 1, wherein the processor is configured to execute the program and perform the process further including
determining the abnormality in the sensing circuitry, or a signal detecting circuit which captures the output of the sensing circuitry, when the position indicated by the third signal indicates a state different from a fully closed state of the door, while the output of the sensing circuitry indicates the fully closed state of the door.

6. The monitoring apparatus as claimed in claim 1, wherein the processor is configured to execute the program and perform the process further including
determining the configuration including the abnormality, based on outputs of a plurality of sensing circuitries.

7. The monitoring apparatus as claimed in claim 6, wherein the processor is configured to execute the program and perform the process further including
determining the abnormality in one sensing circuitry of the plurality of sensing circuitries, when the position indicated by the third signal indicates a state different from the locked state of the door, while the output of the one sensing circuitry of the plurality of sensing circuitries indicates the locked state of the door.

8. The monitoring apparatus as claimed in claim 6, wherein the processor is configured to execute the program and perform the process further including
determining the abnormality in a locking device of the door, or a signal detecting circuit which captures the outputs of the plurality of sensing circuitries, when the position indicated by the third signal indicates a state different from the locked state of the door, while all of the outputs of the plurality of sensing circuitries indicate the locked state of the door.

9. The monitoring apparatus as claimed in claim 6, wherein the processor is configured to execute the program and perform the process further including
determining the abnormality in one sensing circuitry of the plurality of sensing circuitries, when the position indicated by the third signal indicates a state different from a fully closed state of the door, while the output of the one sensing circuitry of the plurality of sensing circuitries indicates the fully closed state of the door.

10. The monitoring apparatus as claimed in claim 6, wherein the processor is configured to execute the program and perform the process further including
determining the abnormality in the monitoring apparatus which captures the outputs of the plurality of sensing circuitries, when the position indicated by the third signal indicates a state different from a fully closed state of the door, while all of the outputs of the plurality of sensing circuitries indicate the fully closed state of the door.

11. A monitoring method to be implemented by a computer of a monitoring apparatus having a first switch, a second switch, a third switch, and an encoder, the monitoring method comprising:
acquiring an output of a sensing circuitry, including a first signal from the first switch configured to sense a locked or released state of a door of a railway vehicle indicating the locked or released state of the door, a second signal from the second switch configured to sense an open or closed state of the door indicating the open or closed state of the door, and a third signal from an encoder configured to sense a position in an opening or closing direction of the door indicating the position;
determining an abnormality in a configuration related to an opening or closing operation of the door when the locked or released state of the door indicated by the first signal does not match a locked or released state of the door anticipated at the position of the door indicated by the third signal, or when the open or closed state of the door indicated by the first signal does not match an open or closed state of the door anticipated at the position of the door indicated by the third signal; and
performing a corrective activity using a coping strategy based on the determined abnormality.

12. The monitoring method as claimed in claim 11, wherein the determining determines the abnormality during the closing operation or the opening operation of the door.

13. The monitoring method as claimed in claim 11, further comprising:
  performing, multiple times, the determining the abnormality in the configuration related to the opening or closing operation of the door; and
  determining contents of the abnormality, or the configuration including the abnormality, based on results of the performing the determining the multiple times.

14. The monitoring method as claimed in claim 11, wherein the determining the abnormality in the configuration related to the opening or closing operation of the door includes at least one of determining a presence or absence of the abnormality, determining a constituent element having the abnormality, determining an extent of the abnormality, and determining a content of the abnormality.

15. The monitoring apparatus as claimed in claim 1, wherein the determining the abnormality in the configuration related to the opening or closing operation of the door includes at least one of determining a presence or absence of the abnormality, determining a constituent element having the abnormality, determining an extent of the abnormality, and determining a content of the abnormality.

16. An apparatus comprising:
  a sensing circuitry including
    a first switch configured to sense a locked or released state of a door of a railway vehicle and output a first signal indicating the locked or released state of the door,
    a second switch configured to sense an open or closed state of the door and output a second signal indicating the open or closed state of the door, and
    an encoder configured to sense a position in an opening or closing direction of the door and output a third signal indicating the position;
  a storage device configured to store a program; and
  a processor configured to execute the program and perform a process including
    acquiring an output of the sensing circuitry, including the first, second, and third signals,
    determining an abnormality in a configuration related to an opening or closing operation of the door when the locked or released state of the door indicated by the first signal does not match a locked or released state of the door anticipated at the position of the door indicated by the third signal, or when the open or closed state of the door indicated by the second signal does not match an open or closed state of the door anticipated at the position of the door indicated by the third signal, and
    employing different coping strategies to determine a presence or absence of the abnormality in the configuration related to the opening or closing operation of the door, based on at least one of frequency and continuity of the determined abnormality.

17. The apparatus as claimed in claim 16, wherein:
the sensing circuitry further includes a signal detection circuit configured to detect an output of the sensing circuitry,
the acquiring performed by the process of the processor acquires the output of the sensing circuitry detected by the signal detection circuit, including the first, second, and third signals, and
the determined abnormality in the configuration related to the opening or closing operation of the door includes contents of the determined abnormality, and a location of the determined abnormality within the sensing circuitry.

* * * * *